(12) United States Patent
Cushing et al.

(10) Patent No.: US 12,730,068 B2
(45) Date of Patent: Sep. 8, 2026

(54) DISTRIBUTED TIME RESOLVED FLUORESCENCE SENSOR USING TEMPORALLY CORRELATED PHOTONS

(71) Applicant: California Institute of Technology, Pasadena, CA (US)

(72) Inventors: Scott K. Cushing, Glendale, CA (US); Nathan A. Harper, Pasadena, CA (US); Bryce P. Hickam, Pasadena, CA (US); Manni He, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 92 days.

(21) Appl. No.: 18/661,091

(22) Filed: May 10, 2024

(65) Prior Publication Data

US 2024/0377323 A1 Nov. 14, 2024

Related U.S. Application Data

(60) Provisional application No. 63/465,609, filed on May 11, 2023.

(51) Int. Cl.
*G01N 21/64* (2006.01)

(52) U.S. Cl.
CPC ... *G01N 21/6408* (2013.01); *G01N 2201/068* (2013.01); *G01N 2201/126* (2013.01)

(58) Field of Classification Search
CPC ......... G01N 21/6408; G01N 2201/068; G01N 2201/126
See application file for complete search history.

(56) References Cited

U.S. PATENT DOCUMENTS 11,193,750 B1 * 12/2021 Fertig ..................... G01S 19/23
2009/0194702 A1 8/2009 Meyers et al.
2013/0258453 A1 10/2013 Arahira
(Continued)

FOREIGN PATENT DOCUMENTS

WO 2021174211 9/2021
WO 2023275738 1/2023

OTHER PUBLICATIONS

PCT International Search Report & Written Opinion dated Aug. 30, 2024 for PCT Application No. PCT/US2024/028882.
(Continued)

*Primary Examiner* — Mark R Gaworecki
(74) *Attorney, Agent, or Firm* — Gates & Cooper LLP

(57) ABSTRACT

A device including a continuous (CW)]] wave source of pairs of entangled photons comprising a first photon entangled with a second photon; a first channel terminated by a first detector configured to detect the first photon and a second channel terminated by a second detector configured to detect a output photon emitted by an excited state of matter excited by the second photon in the second channel; a splitter for splitting the pairs of entangled photons into the channels, so that the first photon comprising a reference photon is transmitted to the first channel and the second photon is transmitted to the second channel; and a timing circuit coupled to the detectors operable to measure a time delay between arrival times measured at the detectors of the output photon and the first photon entangled with the second photon used to generate the output photon.

20 Claims, 12 Drawing Sheets

(56) References Cited

U.S. PATENT DOCUMENTS

2022/0113529 A1 4/2022 Bond et al.
2022/0382125 A1 12/2022 Cushing et al.

OTHER PUBLICATIONS

Alander, J. T.; Kaartinen, I.; Laakso, A.; Patila, T.; Spillmann, T.; Tuchin, V. V.; Venermo, M.; Välisuo, P. A Review of Indocyanine Green Fluorescent Imaging in Surgery. Journal of Biomedical Imaging 2012, 2012, 7:7. https://doi.org/10.1155/2012/940585.

Asban, S.; Dorfman, K. E.; Mukamel, S. Interferometric Spectroscopy with Quantum Light: Revealing out-of-Time-Ordering Correlators. The Journal of Chemical Physics 2021, 154 (21), 210901. https://doi.org/10.1063/5.0047776.

Audrey Eshun, Xiyu Yi, Ashleigh Wilson, Sam Jeppson, Jae Hyuck Yoo, Shervin Kiannejad, Mike Rushford, Tiziana Bond, and Ted Laurence, "Fluorescence lifetime measurements using photon pair correlations generated via spontaneous parametric down conversion (SPDC)," Opt. Express 31, 26935-26947 (2023) https://doi.org/10.1364/OE.494744.

Zhao, J.; Ma, C.; Rusing, M.; Mookherjea, S. High Quality Entangled Photon Pair Generation in Periodically Poled Thin-Film Lithium Niobate Waveguides. Phys. Rev. Lett. 2020, 124 (16), 163603. https://doi.org/10.1103/PhysRevLett.124.163603.

Becker, W. Fluorescence Lifetime Imaging—Techniques and Applications. Journal of Microscopy 2012, 247 (2), 119-136. https://doi.org/10.1111/j.1365-2818.2012.03618.x.

Beer, M.; Haase, J. F.; Ruskowski, J.; Kokozinski, R. Background Light Rejection in SPAD-Based LiDAR Sensors by Adaptive Photon Coincidence Detection. Sensors 2018, 18 (12), 4338. https://doi.org/10.3390/s18124338.

Berezin, M. Y.; Lee, H.; Akers, W.; Achilefu, S. Near Infrared Dyes as Lifetime Solvatochromic Probes for Micropolarity Measurements of Biological Systems. Biophys J 2007, 93 (8), 2892-2899. https://doi.org/10.1529/biophysj.107.111609.

Blondel, W.; Delconte, A.; Khairallah, G.; Marchal, F.; Gavoille, A.; Amouroux, M. Spatially-Resolved Multiply-Excited Autofluorescence and Diffuse Reflectance Spectroscopy: SpectroLive Medical Device for Skin In Vivo Optical Biopsy. Electronics 2021, 10 (3), 243. https://doi.org/10.3390/electronics10030243.

Bright, F. V.; Munson, C. A. Time-Resolved Fluorescence Spectroscopy for Illuminating Complex Systems. Analytica Chimica Acta 2003, 500 (1), 71-104. https://doi.org/10.1016/S0003-2670(03)00723-2.

Brumer, P.; Shapiro, M. Molecular Response in One-Photon Absorption via Natural Thermal Light vs. Pulsed Laser Excitation. Proceedings of the National Academy of Sciences 2012, 109 (48), 19575-19578. https://doi.org/10.1073/pnas.1211209109.

Zavatta, A.; Viciani, S.; Bellini, M. Single-Photon Excitation of a Coherent State: Catching the Elementary Step of Stimulated Light Emission. Phys. Rev. A 2005, 72 (2), 023820. https://doi.org/10.1103/PhysRevA.72.023820.

Datta, R.; Heaster, T. M.; Sharick, J. T.; Gillette, A. A.; Skala, M. C. Fluorescence Lifetime Imaging Microscopy: Fundamentals and Advances in Instrumentation, Analysis, and Applications. JBO 2020, 25 (7), 071203. https://doi.org/10.1117/1.JBO.25.7.071203.

Davenport, M. L.; Liu, S.; Bowers, J. E. Integrated Heterogeneous Silicon/III-V Mode-Locked Lasers. Photon. Res., PRJ 2018, 6 (5), 468-478. https://doi.org/10.1364/PRJ.6.000468.

Dorfman, K. E.; Schlawin, F.; Mukamel, S. Nonlinear Optical Signals and Spectroscopy with Quantum Light. Rev. Mod. Phys. 2016, 88 (4), 045008. https://doi.org/10.1103/RevModPhys.88.045008.

Dunn, T. J.; Walmsley, I. A.; Mukamel, S. Experimental Determination of the Quantum-Mechanical State of a Molecular Vibrational Mode Using Fluorescence Tomography. Phys. Rev. Lett. 1995, 74 (6), 884-887. https://doi.org/10.1103/PhysRevLett.74.884.

Elson, D. S.; Jo, J. A.; Marcu, L. Miniaturized Side-Viewing Imaging Probe for Fluorescence Lifetime Imaging (FLIM): Validation with Fluorescence Dyes, Tissue Structural Proteins and Tissue Specimens. New J Phys 2007, 9, 127. https://doi.org/10.1088/1367-2630/9/5/127.

Freitag, M.; Teuscher, J.; Saygili, Y.; Zhang, X.; Giordano, F.; Liska, P.; Hua, J.; Zakeeruddin, S. M.; Moser, J.-E.; Grätzel, M.; Hagfeldt, A. Dye-Sensitized Solar Cells for Efficient Power Generation under Ambient Lighting. Nature Photon 2017, 11 (6), 372-378. https://doi.org/10.1038/nphoton.2017.60.

Frimmer, M.; Chen, Y.; Koenderink, A. F. Scanning Emitter Lifetime Imaging Microscopy for Spontaneous Emission Control. Phys. Rev. Lett. 2011, 107 (12), 123602. https://doi.org/10.1103/PhysRevLett.107.123602.

Grinvald, A.; Steinberg, I. Z. On the Analysis of Fluorescence Decay Kinetics by the Method of Least-Squares. Anal Biochem 1974, 59 (2), 583-598. https://doi.org/10.1016/0003-2697(74)90312-1.

Hendrych, M.; Shi, X.; Valencia, A.; Torres, J. P. Broadening the Bandwidth of Entangled Photons: A Step towards the Generation of Extremely Short Biphotons. Phys. Rev. A 2009, 79 (2), 023817. https://doi.org/10.1103/PhysRevA.79.023817.

Hickam, B. P.; He, M.; Harper, N.; Szoke, S.; Cushing, S. K. Single-Photon Scattering Can Account for the Discrepancies among Entangled Two-Photon Measurement Techniques. J. Phys. Chem. Lett. 2022, 4934-4940. https://doi.org/10.1021/acs.jpclett.2c00865.

Inam, F. A.; Grogan, M. D. W.; Rollings, M.; Gaebel, T.; Say, J. M.; Bradac, C.; Birks, T. A.; Wadsworth, W. J.; Castelletto, S.; Rabeau, J. R.; Steel, Michael. J. Emission and Nonradiative Decay of Nanodiamond NV Centers in a Low Refractive Index Environment. ACS Nano 2013, 7 (5), 3833-3843. https://doi.org/10.1021/nn304202g.

Islam, M. S.; Honma, M.; Nakabayashi, T.; Kinjo, M.; Ohta, N. PH Dependence of the Fluorescence Lifetime of FAD in Solution and in Cells. International Journal of Molecular Sciences 2013, 14 (1), 1952-1963. https://doi.org/10.3390/ijms14011952.

Javid, U. A.; Ling, J.; Staffa, J.; Li, M.; He, Y.; Lin, Q. Ultrabroadband Entangled Photons on a Nanophotonic Chip. Phys. Rev. Lett. 2021, 127 (18), 183601. https://doi.org/10.1103/PhysRevLett.127.183601.

Köllner, M.; Wolfrum, J. How Many Photons Are Necessary for Fluorescence-Lifetime Measurements? Chemical Physics Letters 1992, 200 (1), 199-204. https://doi.org/10.1016/0009-2614(92)87068-Z.

Kumar, R.; Ong, J. R.; Savanier, M.; Mookherjea, S. Controlling the Spectrum of Photons Generated on a Silicon Nanophotonic Chip. Nat Commun 2014, 5 (1), 5489. https://doi.org/10.1038/ncomms6489.

Lu, Z. G.; Liu, J. R.; Raymond, S.; Poole, P. J.; Barrios, P. J.; Poitras, D. 312-Fs Pulse Generation from a Passive C-Band InAs/InP Quantum Dot Mode-Locked Laser. Opt. Express, OE 2008, 16 (14), 10835-10840. https://doi.org/10.1364/OE.16.010835.

MacLean, J.-P.W.; Donohue, J. M.; Resch, K. J. Direct Characterization of Ultrafast Energy-Time Entangled Photon Pairs. Phys. Rev. Lett. 2018, 120 (5), 053601. https://doi.org/10.1103/PhysRevLett.120.053601.

Maruyama, Y.; Charbon, E. An All-Digital, Time-Gated 128×128 Spad Array for on-Chip, Filter-Less Fluorescence Detection. In 2011 16th International Solid-State Sensors, Actuators and Microsystems Conference; 2011; pp. 1180-1183. https://doi.org/10.1109/Transducers.2011.5969324.

Menzel, E. R.; Popovic, Z. D. Picosecond-resolution Fluorescence Lifetime Measuring System with a Cw Laser and a Radio. Review of Scientific Instruments 2008, 49 (1), 39-44. https://doi.org/10.1063/1.1135248.

Nasr, M. B.; Carrasco, S.; Saleh, B. E. A.; Sergienko, A. V.; Teich, M. C.; Torres, J. P.; Torner, L.; Hum, D. S.; Fejer, M. M. Ultrabroadband Biphotons Generated via Chirped Quasi-Phase-Matched Optical Parametric Down-Conversion. Phys. Rev. Lett. 2008, 100 (18), 183601. https://doi.org/10.1103/PhysRevLett.100.183601.

Oka, H. Real-Time Analysis of Two-Photon Excitation by Correlated Photons: Pulse-Width Dependence of Excitation Efficiency. Phys. Rev. A 2010, 81 (5), 053837. https://doi.org/10.1103/PhysRevA.81.053837.

(56) References Cited

OTHER PUBLICATIONS

Ouyang, Y.; Liu, Y.; Wang, Z. M.; Liu, Z.; Wu, M. Flim as a Promising Tool for Cancer Diagnosis and Treatment Monitoring. Nano-Micro Lett. 2021, 13 (1), 133. https://doi.org/10.1007/s40820-021-00653-z.
Paterson, A. S.; Raja, B.; Mandadi, V.; Townsend, B.; Lee, M.; Buell, A.; Vu, B.; Brgoch, J.; Willson, R. C. A Low-Cost Smartphone-Based Platform for Highly Sensitive Point-of-Care Testing with Persistent Luminescent Phosphors. Lab Chip 2017, 17 (6), 1051-1059. https://doi.org/10.1039/C6LC01167E.
Reich, N. H.; van Sark, W. G. J. H. M.; Turkenburg, W. C. Charge Yield Potential of Indoor-Operated Solar Cells Incorporated into Product Integrated Photovoltaic (PIPV). Renewable Energy 2011, 36 (2), 642-647. https://doi.org/10.1016/j.renene.2010.07.018.
Reinhart, M. B.; Huntington, C. R.; Blair, L. J.; Heniford, B. T.; Augenstein, V. A. Indocyanine Green: Historical Context, Current Applications, and Future Considerations. Surg Innov 2016, 23 (2), 166-175. https://doi.org/10.1177/1553350615604053.
Scarcelli, G.; Yun, S. H. Entangled-Photon Coincidence Fluorescence Imaging. Opt. Express, OE 2008, 16 (20), 16189-16194. https://doi.org/10.1364/OE.16.016189.
Schell, A. W.; Engel, P.; Werra, J. F. M.; Wolff, C.; Busch, K.; Benson, O. Scanning Single Quantum Emitter Fluorescence Lifetime Imaging: Quantitative Analysis of the Local Density of Photonic States. Nano Lett. 2014, 14 (5), 2623-2627. https://doi.org/10.1021/nl500460c.
Sekar, R. B.; Periasamy, A. Fluorescence Resonance Energy Transfer (FRET) Microscopy Imaging of Live Cell Protein Localizations. J Cell Biol 2003, 160 (5), 629-633. https://doi.org/10.1083/jcb.200210140.
Shen, B.; Bose, S.; Johnston, M. L. On-Chip High-Voltage SPAD Bias Generation Using a Dual-Mode, Closed-Loop Charge Pump. In 2017 IEEE International Symposium on Circuits and Systems (ISCAS); 2017; pp. 1-4. https://doi.org/10.1109/ISCAS.2017.8050855.
Sumitani, M.; Nakashima, N.; Yoshihara, K.; Nagakura, S. Temperature Dependence of Fluorescence Lifetimes of Trans-Stilbene. Chemical Physics Letters 1977, 51 (1), 183-185. https://doi.org/10.1016/0009-2614(77)85381-5.
Szoke, S.; He, M.; Hickam, B. P.; Cushing, S. K. Designing High-Power, Octave Spanning Entangled Photon Sources for Quantum Spectroscopy. J. Chem. Phys. 2021, 154 (24), 244201. https://doi.org/10.1063/5.0053688.
Time-Resolved Fluorescence Techniques. In Molecular fluorescence; John Wiley & Sons, Ltd, 2012; pp. 285-325. https://doi.org/10.1002/9783527650002.ch10.
Tisa, S.; Zappa, F.; Labanca, I. On-Chip Detection and Counting of Single-Photons. In IEEE InternationalElectron Devices Meeting, 2005. IEDM Technical Digest.; 2005; pp. 815-818. https://doi.org/10.1109/IEDM.2005.1609480.
Turgeman, L.; Fixler, D. Photon Efficiency Optimization in Time-Correlated Single Photon Counting Technique for Fluorescence Lifetime Imaging Systems. IEEE Transactions on Biomedical Engineering 2013, 60 (6), 1571-1579. https://doi.org/10.1109/TBME.2013.2238671.
Wang, Z.; Zheng, Y.; Zhao, D.; Zhao, Z.; Liu, L.; Pliss, A.; Zhu, F.; Liu, J.; Qu, J.; Luan, P. Applications of Fluorescence Lifetime Imaging in Clinical Medicine. J. Innov. Opt. Health Sci. 2018, 11 (01), 1830001. https://doi.org/10.1142/S179354581830001X.

* cited by examiner

DISTRIBUTED TIME RESOLVED FLUORESCENCE SENSOR USING TEMPORALLY CORRELATED PHOTONS

CROSS-REFERENCE TO RELATED APPLICATIONS

This application claims the benefit under 35 U.S.C. Section 119(e) of U.S. Provisional Application No. 63/465,609 filed May 11, 2023, by Scott K. Cushing, Nathan A. Harper, Bryce P. Hickam, and Manni He, entitled "DISTRIBUTED TIME RESOLVED FLUORESCENCE SENSOR USING TEMPORALLY CORRELATED SINGLE," which application is incorporated by reference herein.

FEDERALLY SPONSORED RESEARCH AND DEVELOPMENT

This invention was made with government support under Grant No. DE-SC0020151 awarded by the Department of Energy. The government has certain rights in the invention.

BACKGROUND OF THE INVENTION (Note: This application references a number of different publications as indicated throughout the specification by one or more reference numbers a superscript, e.g., [x]. A list of these different publications ordered according to these reference numbers can be found below in the section entitled "References." Each of these publications is incorporated by reference herein.)

Time-resolved fluorescence spectroscopy is routinely used in laboratory and clinical settings to measure excited state dynamics, and just as importantly, how changes to the lifetime provide information about the local environment surrounding the fluorophore[1,2]. The advent of inexpensive pulsed laser diodes has led to a proliferation of time-domain fluorescence lifetime techniques in biosensing and microscopy beyond initial physical chemistry applications. Measured lifetimes are intrinsically fluorophore-specific and depend on variations in the surrounding chemical environment, such as temperature[3], pH[4], neighboring fluorophores[5], and the quantum state[6-9]. This specificity, alongside developments in highly fluorescent tagging proteins and molecular markers, has also enabled fluorescence lifetime imaging microscopy (FLIM) to become a ubiquitous technique to visualize and understand complex biological samples[10,11]. Autofluorescence endogenous to cellular environments has permitted label-free FLIM medical imaging applications, including clinical cancer diagnosis[12-14].

The next frontier for time-resolved fluorescence is highly distributable, wearable devices[15,16]. At these spatial scales and cost targets, the same pulsed lasers that enabled proliferation of laboratory measurements become a barrier. While on-chip pulsed lasers are being developed, most still require an external power source for the diode or pulse generation[17]. Further, the short on-chip cavity lengths lead to GHz repetition rates that do not give sufficient time for fluorophores to fully relax between pulses[18]. To date, on-chip pulses are mostly in the picosecond range, although recent publications have shown pulses as short as 350 fs[19]. These integrated pulsed lasers typically have a narrow wavelength tuning range, which can make measurements of multiple fluorescent probes or dynamics from multiple local environments difficult[20]. What is needed then, are more efficient methods of performing spectroscopy for commercial applications, The present disclosure satisfies this need.

SUMMARY OF THE INVENTION

Fluorescence lifetime experiments are a standard approach for measuring excited state dynamics and local environment effects for a range of sensing and measurement phenomena. In one illustrate embodiment, we demonstrate that two photons created from the down-conversion of one photon emitted from a constant wavelength or other non-pulsed source in nature but with deterministic temporal correlations, or multiple processes therein creating a set of temporally correlated photons, can provide equivalent or superior performance to a pulsed laser in time resolved fluorescence imaging. Such deterministic photon creation is usually controlled through the use of nonlinear processes, herein particularly shown for the spontaneous parametric down-conversion creating entangled photons but can also be created by other techniques. Temporal correlation between the two or more photons created from an individual photon allow for coincidence counting of a fluorescence event, wherein one or more photons are measured as the change in temporal correlation between said photons and the emitted photon. Such light sources are routinely created using on-chip photonics. Using this technique, low power, even battery operated sources can now be used to measure excited state or changes in local environment therein.

The data presented herein demonstrates that molecular excited state lifetimes can be measured using the temporal correlations of entangled photons produced from a continuous wave (CW) laser. As an illustrative embodiment, the solvent-dependent lifetime of indocyanine green was measured in methanol, ethanol, and DMSO in agreement with previous reports using pulsed lasers. The low pump flux needed for spontaneous parametric down-conversion (SPDC) provides a direct route to time-resolved fluorescence measurements using on-chip, CMOS compatible photonics. Multiple waveguides and temperature tuning of phase matching can be used in the future to quickly measure a wide range of fluorophores from a single SPDC source and photonic circuit. Overall, using a CW laser diode as a pump source opens new horizons for performing complex spectroscopic and microscopic studies with quantum light sources.

Although illustrative embodiments were demonstrated for fluorescence applications, the system can be used for other characterization of (e.g., excited) states of a sample. Moreover, while SPDC nonlinear crystals were used to generate entangled photons, other methods of generating entangled photons could be used.

BRIEF DESCRIPTION OF DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

An alternative to pulsed lasers is to leverage the inherent quantum correlations between entangled photons in a pair. When one high-energy pump photon splits into a pair of two lower-energy entangled photons through spontaneous parametric down-conversion (SPDC), the two single photons are deterministically correlated in time[21]. Thus if one photon is used to excite a fluorophore, coincidence detection of the resulting fluorescence with the other entangled photon provides a measurement of the time-resolved fluorescence[22]. The uncertainty in the temporal width of the photon pair wave packet can range from tens[23-25] to hundreds[21] of femtoseconds, enabling time-resolved measurements comparable to tabletop classical pulsed lasers. It is also key to note that, unlike CW phase modulation spectroscopy[26], a high frequency modulator is not needed for this technique due to its utilization of the inherent correlations between two entangled photons.

Despite theoretical interest in utilizing entangled pairs to perform lifetime measurements[22,34,35], an experimental demonstration has not yet been published.

Example Setup

Figure 1:
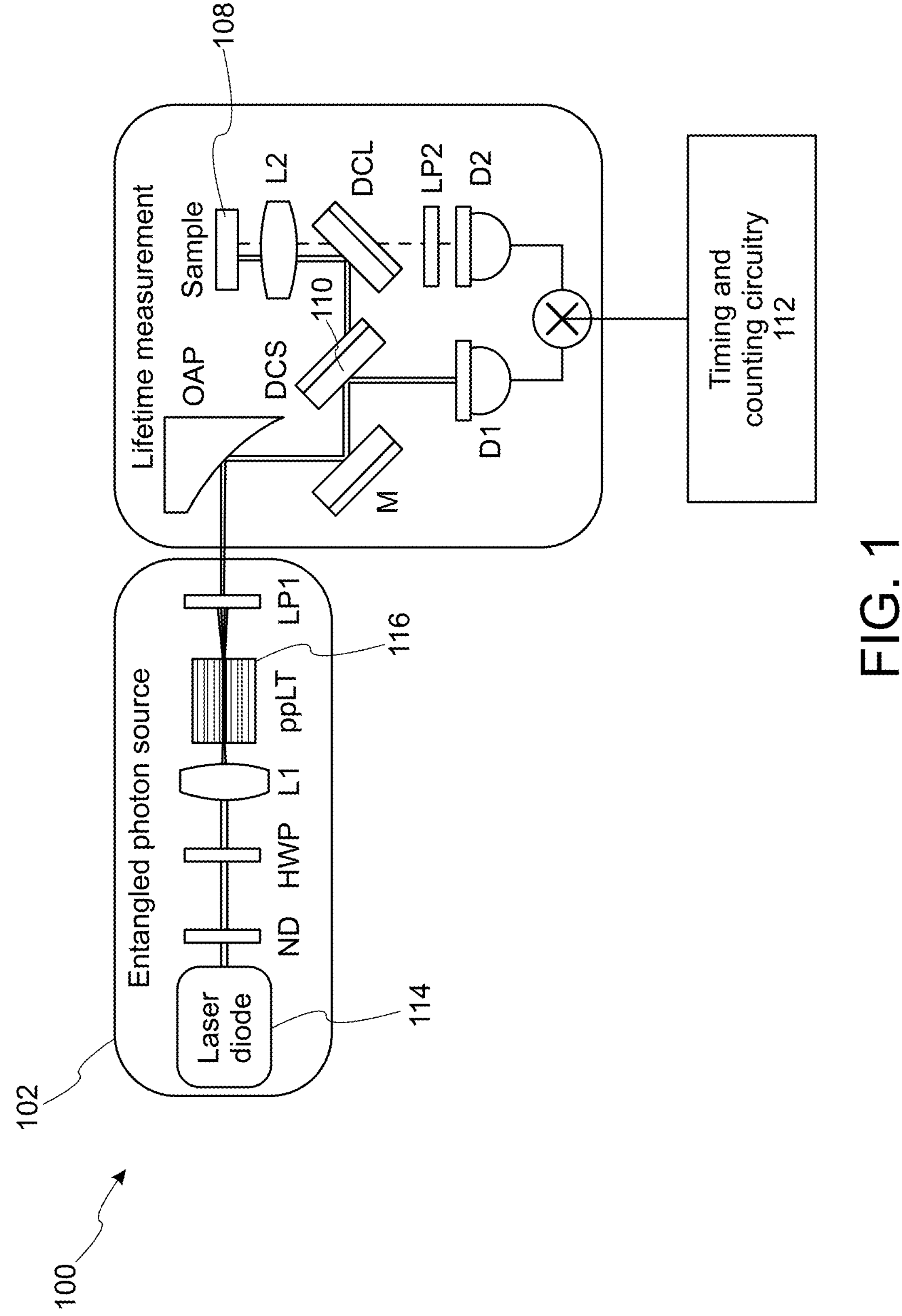
FIG. 1: Experimental configuration for measuring fluorescence lifetimes with energy-time entangled photon pairs. The broadband entangled photon source consists of a 402.5 nm laser diode that is focused into a periodically poled lithium tantalate crystal. The resulting entangled photons (solid red lines) are collimated with an off-axis parabolic (OAP) mirror and then separated by wavelength with a dichroic mirror. One photon from the entangled pair is directed to a detector to herald the measurement while the other is focused onto a molecular sample with a high numerical aperture (NA) aspheric lens. The lens collects the backwards emission from the sample's fluorescence (dashed red line) which is then directed through a series of long-pass filters onto a second detector. A coincidence circuit generates histograms of the arrival times between the reference and fluorescence photons. ND: neutral density filters, HWP: half-wave plate, L1: UVFS focusing lens, ppLT: periodically poled lithium tantalate grating, LP1: 500 nm long-pass filter, OAP: off-axis parabolic mirror, M: mirror, DCS: dichroic short-pass mirror (cut-on wavelength 805 nm), DCL: dichroic short-pass mirror (cut-on wavelength 810 nm), L2: high NA aspheric lens, LP2: 808 nm long-pass filter, D1 and D2: multimode fiber coupled single photon avalanche photodiodes connected to a coincidence circuit.

FIG. 1 illustrates an experimental configuration for performing fluorescence lifetime measurements with entangled photon pairs. In this example for which experimental data was obtained. 2 mW of power from a 402.5 nm CW laser diode pumped a periodically poled, Type-0 SPDC crystal to generate entangled photon pairs spanning 720 nm to 913 nm. In this example, the pump laser power was significantly reduced using neutral density filters to avoid saturating the single photon counting detectors. The periodically poled bulk source used here produced free-space pairs, adding down-stream losses due to collimation and fiber coupling. A waveguided equivalent would enable the same studies to be performed on-chip and with μW pump powers.

The energies of the photons in the entangled pair sum to that of the pump laser. For the entangled photon source used, one photon has a wavelength between 720-805 nm with a simultaneously produced conjugate photon between 805-913 nm. The resulting correlation time from this bandwidth was ~30 fs, comparable to the pulse width of state-of-the-art mode locked lasers[38]. The detectors used in this experiment had a larger timing jitter (3.65 ns) than the temporal characteristics of the source and ultimately determined the experimental temporal resolution, as explained later in more detail.

The entangled photon pairs were then deterministically split using a short-pass dichroic filter tuned to 805 nm. The reflected lower energy photon heralds the measurement when it is detected by a single photon counting avalanche detector (SPAD), starting the timer for a time-correlated single photon counting (TCSPC) circuit. The higher energy photon was sent to the sample, where it excited a single molecule that then emits a single fluorescence photon with some delay. The fluorescence photon was collected in an epifluorescence scheme and then detected by another SPAD which stopped the timer on the TCSPC board. The time delay between the heralding and fluorescence photon detections was recorded over multiple measurements to create a histogram of such time differences, from which the fluorescence lifetime could be extracted.

Example Measurements Using Example Setup

Figures 2A, 2B:
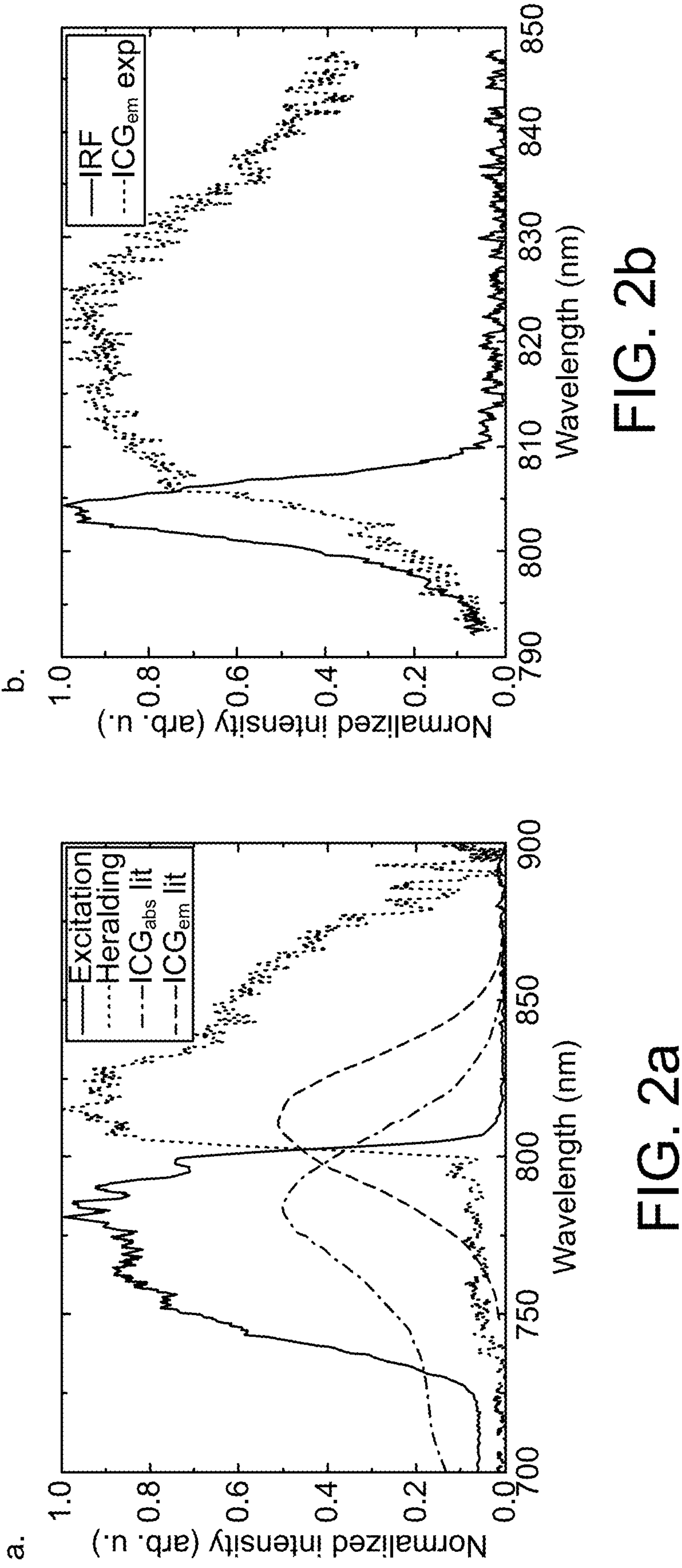
FIG. 2*a* Normalized spectra of the entangled photons used for the heralding and excitation photons compared to the normalized absorption/emission spectra for ICG in methanol.
FIG. 2*b*. Normalized fluorescence signal from 100 μM ICG in methanol following entangled photon excitation compared to the portion of entangled photon flux that is used to characterize the instrument response function.

The molecular dye indocyanine green (ICG) was used as a proof of principle since it is commonly utilized to perform fluorescence imaging in biological and clinical settings[39,40]. ICG also has appropriate spectral properties relative to the entangled photon source and a well-characterized lifetime dependence on the solvent environment[37]. Methanol, ethanol, and dimethylsulfoxide (DMSO) were selected as solvents due to their variation of the ICG lifetime by hundreds of picoseconds. The absorption wavelength, emission wavelength, and quantum yield change only slightly across the three solvents (See Table 1). The spectrum of the SPDC was tuned through the phase matching temperature to maximize spectral overlap with the sample (FIG. 2*a*). The resulting ICG fluorescence (FIG. 2*b*) was separated from the excitation beam with a long-pass dichroic mirror and further filtered with an OD6 long-pass interference filter. The instrument response function (IRF, FIG. 2*b*), which characterizes the response that would be measured by a sample with an infinitely short lifetime, was obtained by replacing the sample with a mirror and removing the final long-pass OD6 filter to allow part of the excitation flux to reach the second detector. The IRF spectrum is altered from the excitation spectrum because it has been filtered by the dichroic mirror, but this alteration has minimal impact on the time-domain response due to the minimal wavelength sensitivity of the SPADs used here.

Example Fitting of the Data

The timing uncertainty broadens the detection of the fluorescence photons by the total IRF. The current temporal resolution of the experiment was limited by the timing uncertainty of the detection electronics, just as with most pulsed laser experiments. The measured histograms R(t) are described by a convolution of the sample's temporal response S(t) with the IRF:

$$R(t) = S(t) * IRF(t) = \int_{-\infty}^{t} S(t')IRF(t-t')dt'$$

After a measurement, the fluorophore lifetime was fit by the sample response function that gave the best match to the measured experimental data. Here, that was a single exponential, but a more complex function could be used if a mixture of lifetimes is present. Therefore, conceptually, the data produced is analogous to TCSPC with a pulsed laser.

From theoretical analysis, the minimum fluorescence lifetime that can be measured before deviation in the fit lifetime occurs is approximately 10% of the IRF width[36]. The IRF width in this experiment was approximately 3.65 ns, limiting our instrument to lifetime measurements greater than 365 ps. The counting circuit used here has a minimum time bin width of 4 ps with a 12 ps electrical time resolution, thus the primary factor in the 3.65 ns IRF width is the SPAD timing jitter. It should be noted that detectors with picosecond timing jitter and GHz count rates are commercially available but were not available to our lab at the time of this experiment. The central moment of the IRF drifts over time, in this case with a 50 ps standard deviation over 20 minutes, therefore all lifetimes measured using this approach are reported with this level of uncertainty.

Figures 3A, 3B:
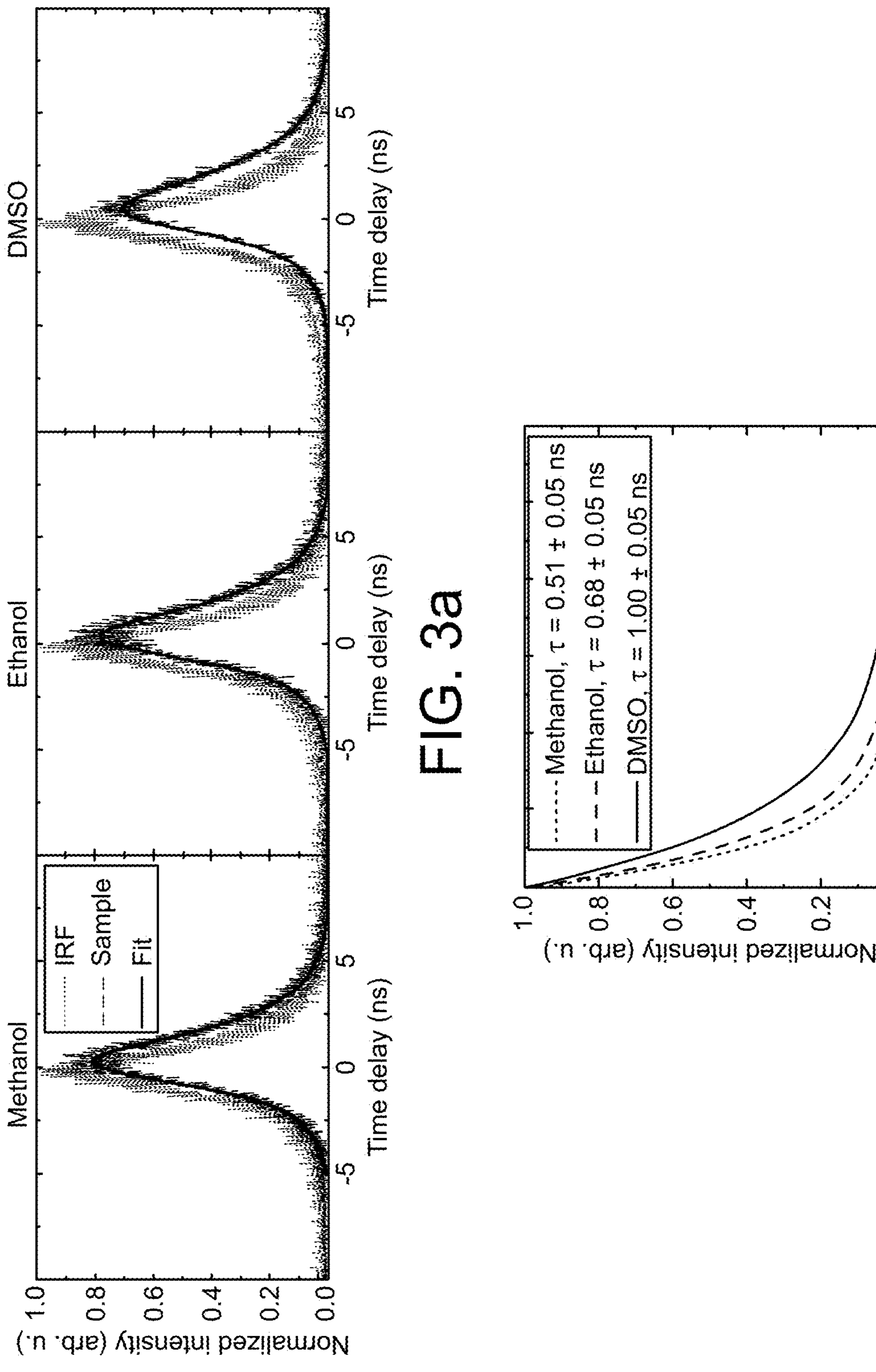
FIG. 3*a*. Normalized instrument response, TCSPC histogram, and fit of the histogram for ICG in methanol (left), ethanol (center), and DMSO (right).
FIG. 3*b*. Normalized fluorescence lifetime decays of ICG in each solvent measured with entangled photon pairs.

The TCSPC histograms for ICG in three solvents, the IRFs, and the fits of the fluorescence lifetime are shown in FIG. 3*a*. The measured TCSPC histograms for ICG in different solvents are shifted and broadened due to the nonzero lifetime. This broadening is more pronounced in DMSO compared to methanol and ethanol because of the longer ICG lifetime in this solvent. The ICG excited state lifetimes from fitting are presented in Table 1 and the exponential decays corresponding to these lifetimes are shown in FIG. 3*b*. The measured lifetimes agree with previously reported values[37] within error. The near-unity $\chi^2$ values and uncorrelated weighted residuals (Supporting Information, FIG. 3) suggest the single exponential response fitting is sufficient. The standard deviation of the measurements for all experiments are reported as 50 ps due to detector drift, which is larger than the 3 ps standard errors from the fit. The curves in FIG. 3*a* are normalized and background subtracted for clarity. The raw experimental data plotted on a logarithmic scale is also available in Supporting Information, FIG. 7. An experiment where the sample is replaced by a blank cuvette of methanol does not yield a measurable coincidence peak (Supporting Information, FIG. 5).

Figure 4:
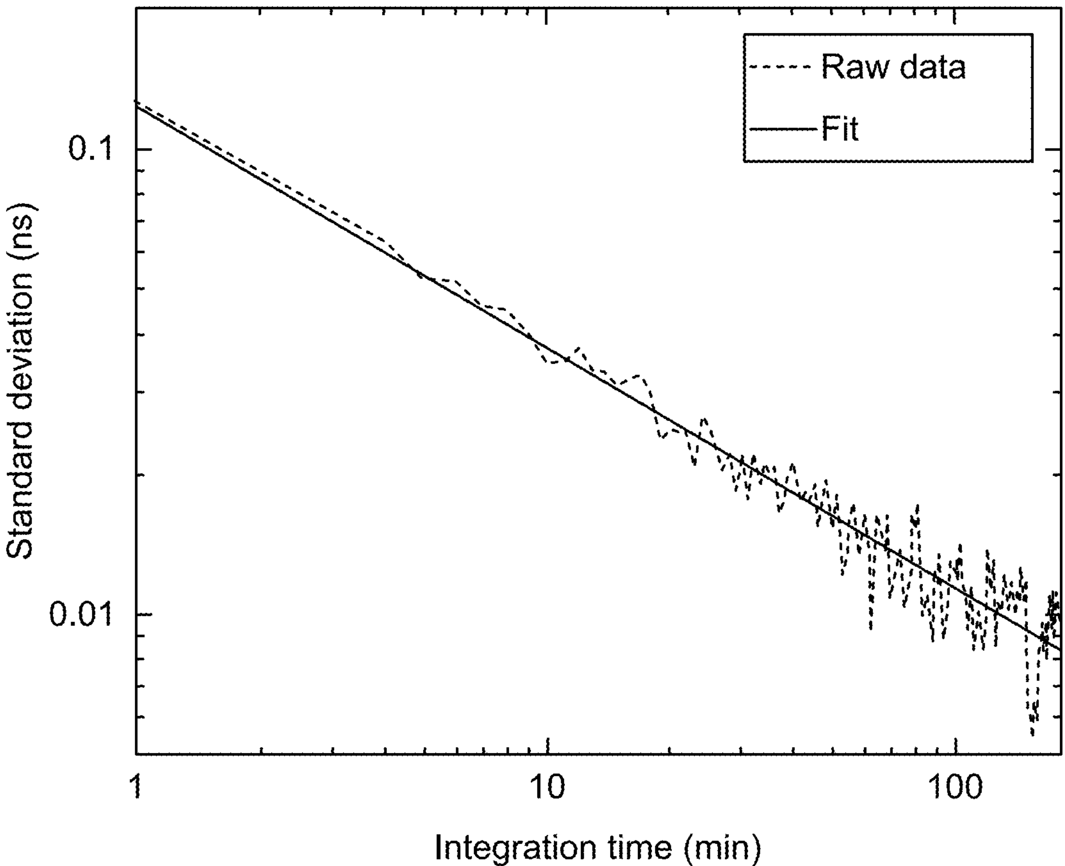
FIG. 4: Standard deviation of the fit lifetime with respect to integration time for ICG in DMSO.

The practicality of entangled photons for fluorescence lifetime measurements should also be quantified. Due to the Poissonian statistics of photon counting, the signal-to-noise ratio is expected to scale according to $\sqrt{N}$, where N is the number of true coincident photon events recorded. The number of coincidences can be increased either by increasing the SPDC flux or by increasing the integration time of each histogram. To verify the noise statistics, the fit procedure was repeated on one-minute subsets of a 14 hour DMSO dataset (FIG. 4). As expected, the uncertainty in the fitted lifetime in DMSO scales proportionally to $N^{-0.53\pm0.01}$, close to the expected $N^{-1/2}$ (FIG. 4). For each sampling interval, the dataset was binned and a fit was performed on each of the resulting histograms. The resulting standard deviation of the inferred lifetimes was recorded. The increasing uncertainty in the standard deviation at long integration times originates from drift of the counting electronics.

FIG. 4 suggest that integration times on the order of several minutes would be sufficient for lifetime determination with a 10% uncertainty, based on the detectors used here that saturate at $10^6$ photons/s fluxes. The integration time could be reduced to less than one minute by using higher count rate detectors, such as those that can reach $10^9$ photon/s, given that the pair rate of the experimental entangled source could have been increased by over two orders of magnitude. Theoretically, only ~200 coincidences are necessary for single exponential decay lifetimes to be determined with 10% uncertainty when the IRF is shorter than the molecular lifetime[41], potentially further lowering the experimental integration time to below one second, closer to current microscopic techniques. Using coincidence counting also leads to rejection of background, classical photons on the order of 1,000:1, making the scheme feasible even in sun-lit and room-lit conditions[42].

The technique is therefore aptly timed with the rapidly evolving world of photon counting detector technology[43-45], especially given that THz flux entangled photon sources are already feasible. FIG. 4 provides evidence that the use of GHz bandwidth detectors coupled with high efficiency ($10^{-6}$) entangled photon sources would allow for reasonable integration times even with ~μW power CW laser diode lasers. Thus, the technique presented here has multiple interesting outlooks compared to conventional pulsed laser TCSPC or CW modulated fluorescence lifetime measurements, whether it is used for on-chip technology advances, investigation of dynamics in the single-photon excitation limit, or to explore the ability of quantum systems and molecules to preserve incident quantum states of light.

Further Information on the Details of the Specific Experimental Configuration of the Example Used to Obtain the Data Presented Herein (Referring Also to FIG. 1).

Broadband entangled pairs were generated in a periodically poled crystal whose design and characterization, as well as its use in studying entangled light-matter interactions, has been reported previously[25,46]. Photon pairs were generated by Type-0 spontaneous parametric down-conversion in a third-order periodically poled 8% MgO-doped congruent lithium tantalate (CLT) bulk crystal (HC Photonics). The crystal was pumped with a continuous wave diode laser with a maximum power of 400 mW at 402.5 nm and FWHM linewidth of 1 nm (Coherent OBIS). The pump polarization was conditioned with a polarizing beamsplitter (Thorlabs PBSW-405) and half-wave plate (Thorlabs WPH10M-405) before being focused through the SPDC crystal with a 40 cm focal length UV-fused silica lens (Eksma Optics). The temperature of the crystal and subsequent entangled photon bandwidth and spectrum was set and maintained using a chip heater and PID loop with an accuracy of 10 mK (Covesion). For measurements of indocyanine green (ICG, Sigma Aldrich) the crystal was heated to 75.0 C to tune the SPDC to a nondegenerate spectrum where the low-wavelength photons overlap with the ICG absorption curve. A series of 500 nm OD 4 long-pass (Edmund Optics #84-706) and spatial filters (irises) removed any remaining pump photons and select the entangled photon pairs that are collinear with the pump beam.

Following the filters, the entangled photons were collimated with an off-axis parabolic mirror (Thorlabs) and directed to a short-pass dichroic mirror with a nominal cut-on wavelength of 800 nm (Edmund Optics #69-196). The incidence angle of the dichroic mirror was fine-tuned with a rotation mount (Thorlabs RP005) to increase the cut-on wavelength to 805 nm, the degenerate wavelength of the pairs, as measured with a grating spectrometer (Princeton Instruments IsoPlane SCT-320, 150 gr/mm grating with 800 nm blaze) and electron multiplying intensified CCD (EMICCD, Princeton Instruments PIMAX4). The reflected flux (805 nm-913 nm) was fiber-coupled into a multimode fiber (105 um core, 0.22 NA, M43L01) using two mirrors and a 4.51 mm focal length aspheric lens (Thorlabs C230TMD-B) and serves as the herald for the experiment. The transmitted flux is directed to a long-pass dichroic mirror with a nominal cut-on wavelength of 800 nm (Edmund Optics #69-883) and serves as the excitation for the sample. The angle of this dichroic mirror is also fine-tuned with a rotation mount (Thorlabs RP005) such that the transmission is >810 nm so that the passband does not overlap with that of the first dichroic mirror. A high-NA 4.51 mm focal length aspheric lens (Thorlabs C230TMD-B) focuses the excitation photons into a 1 mm path length quartz cuvette (Helma/Millipore Sigma) containing ~300 μL of 100 μM ICG in solution. The cuvette was mounted onto a micrometer-driven linear stage to precisely control the position of the sample relative to the focus of the excitation beam. The resulting fluorescence was collected through the long-pass dichroic and coupled into a second SPAD using with two mirrors, a 9.2 mm diameter, 4.51 mm focal length aspheric lens (Thorlabs C230TMD-B), and a multimode fiber (105 um core, 0.22 NA, M43L01). An OD6 808 nm long-pass filter (Semrock LP02-808RE-25) following the dichroic mirror filters any remaining SPDC photons and/or scatter from the fluorescence signal. For the IRF measurements, the sample cuvette was replaced with a mirror, which was positioned so the excitation beam was focused at the surface of the mirror. Differences in pathlength due to the missing glass of the cuvette are estimated to introduce a 5 ps error, which is below the resolution of this experiment. Black cardboard boxes are positioned to block the sample from any pump scatter and minimize background.

Spectral measurements of the heralding and fluorescence photons were performed by collimating the output of the fibers and directing the image onto the spectrometer/EMICCD. The spectrum of the excitation photons was measured similarly by replacing the sample with a multimode fiber with a micrometer-driven x/y translation mount. This same scheme was used with coincidence counting to estimate the number of heralded excitation photons arriving at the sample.

Lifetime measurements were performed by connecting the multimode fibers to SPADs (Laser Components Count) and a coincidence counting circuit (PicoQuant PicoHarp 300). For these experiments, the SPDC between 805 and 912 nm served as the heralding trigger, and the SPAD output was connected to the sync channel of the counting circuit in a forward start-stop mode. The detection events of the fluorescence SPAD served as the stop signal for the experiment, and the SPAD output was connected to the CHI input of the counting circuit. An electronic delay of 30 ns between the arms was implemented through the counting circuit. This offset is subtracted from the time axis of FIG. 3*a* for clarity but is not removed from the raw data in FIGS. 5 and 7. Neutral density filters were used to decrease pump power and resulting SPDC flux to minimize lost heralding events due to the dead-time of the detectors (43 ns). For lifetime measurements, the number of singles in the heralding arm was approximately 105 counts per second, and the number of singles in the fluorescence arm was approximately 600 counts per second. Data collection consists of repeatedly collecting histograms for 60 seconds, with a series of 10 measurements of the singles rates in each channel measured between each histogram to monitor drift in the alignment. For the methanol, ethanol, and DMSO scans, 840, 840, and 960 histograms were collected, resulting in a total experiment time of 14, 14, and 16 hours, respectively. The instrument response function was measured over 240 coincidence histograms for a total of 6 hours. A custom MATLAB fitting routine is used to determine the characteristic excited state lifetime using the iterative reconvolution approach[47]. In this technique, the single-exponential sample response function is varied so that its convolution with the IRF best matches the measured histograms by minimizing the sum of squared errors.

REFERENCES FOR THE EXAMPLE

The Following References are Incorporated by Reference (1) Cundall, R. *Time-Resolved Fluorescence Spectroscopy in Biochemistry and Biology*; Springer Science & Business Media, 2013.

(2) Bright, F. V.; Munson, C. A. Time-Resolved Fluorescence Spectroscopy for Illuminating Complex Systems. *Analytica Chimica Acta* 2003, 500 (1), 71-104. https://doi.org/10.1016/S0003-2670 (03) 00723-2.

(3) Sumitani, M.; Nakashima, N.; Yoshihara, K.; Nagakura, S. Temperature Dependence of Fluorescence Lifetimes of Trans-Stilbene. *Chemical Physics Letters* 1977, 51 (1), 183-185. https://doi.org/10.1016/0009-2614 (77) 85381-5.

(4) Islam, M. S.; Honma, M.; Nakabayashi, T.; Kinjo, M.; Ohta, N. PH Dependence of the Fluorescence Lifetime of FAD in Solution and in Cells. *International Journal of Molecular Sciences* 2013, 14 (1), 1952-1963. https://doi.org/10.3390/ijms14011952.

(5) Sekar, R. B.; Periasamy, A. Fluorescence Resonance Energy Transfer (FRET) Microscopy Imaging of Live Cell Protein Localizations. *J Cell Biol* 2003, 160 (5), 629-633. https://doi.org/10.1083/jcb.200210140.

(6) Frimmer, M.; Chen, Y.; Koenderink, A. F. Scanning Emitter Lifetime Imaging Microscopy for Spontaneous Emission Control. *Phys. Rev. Lett.* 2011, 107 (12), 123602. https://doi.org/10.1103/PhysRevLett.107.123602.

(7) Schell, A. W.; Engel, P.; Werra, J. F. M.; Wolff, C.; Busch, K.; Benson, O. Scanning Single Quantum Emitter Fluorescence Lifetime Imaging: Quantitative Analysis of the Local Density of Photonic States. *Nano Lett.* 2014, 14 (5), 2623-2627. https://doi.org/10.1021/nl500460c.

(8) Inam, F. A.; Grogan, M. D. W.; Rollings, M.; Gaebel, T.; Say, J. M.; Bradac, C.; Birks, T. A.; Wadsworth, W. J.; Castelletto, S.; Rabeau, J. R.; Steel, Michael. J. Emission and Nonradiative Decay of Nanodiamond NV Centers in a Low Refractive Index Environment. *ACS Nano* 2013, 7 (5), 3833-3843. https://doi.org/10.1021/nn304202g.

(9) Dunn, T. J.; Walmsley, I. A.; Mukamel, S. Experimental Determination of the Quantum-Mechanical State of a Molecular Vibrational Mode Using Fluorescence Tomography. *Phys. Rev. Lett.* 1995, 74 (6), 884-887. https://doi.org/10.1103/PhysRevLett.74.884.

(10) Datta, R.; Heaster, T. M.; Sharick, J. T.; Gillette, A. A.; Skala, M. C. Fluorescence Lifetime Imaging Microscopy: Fundamentals and Advances in Instrumentation, Analysis, and Applications. *JBO* 2020, 25 (7), 071203. https://doi.org/10.1117/1.JBO.25.7.071203.

(11) Becker, W. Fluorescence Lifetime Imaging—Techniques and Applications. *Journal of Microscopy* 2012, 247 (2), 119-136. https://doi.org/10.1111/j.1365-2818.2012.03618.x.

(12) Wang, Z.; Zheng, Y.; Zhao, D.; Zhao, Z.; Liu, L.; Pliss, A.; Zhu, F.; Liu, J.; Qu, J.; Luan, P. Applications of Fluorescence Lifetime Imaging in Clinical Medicine. *J. Innov. Opt. Health Sci.* 2018, 11 (01), 1830001. https://doi.org/10.1142/S179354581830001X.

(13) Blondel, W.; Delconte, A.; Khairallah, G.; Marchal, F.; Gavoille, A.; Amouroux, M. Spatially-Resolved Multiply-Excited Autofluorescence and Diffuse Reflectance Spectroscopy: SpectroLive Medical Device for Skin In Vivo Optical Biopsy. *Electronics* 2021, 10 (3), 243. https://doi.org/10.3390/electronics10030243.

(14) Ouyang, Y.; Liu, Y.; Wang, Z. M.; Liu, Z.; Wu, M. FLIM as a Promising Tool for Cancer Diagnosis and Treatment Monitoring. *Nano-Micro Lett.* 2021, 13 (1), 133. https://doi.org/10.1007/s40820-021-00653-z.

(15) Elson, D. S.; Jo, J. A.; Marcu, L. Miniaturized Side-Viewing Imaging Probe for Fluorescence Lifetime Imaging (FLIM): Validation with Fluorescence Dyes, Tissue Structural Proteins and Tissue Specimens. *New J Phys* 2007, 9, 127. https://doi.org/10.1088/1367-2630/9/5/127.

(16) Paterson, A. S.; Raja, B.; Mandadi, V.; Townsend, B.; Lee, M.; Buell, A.; Vu, B.; Brgoch, J.; Willson, R. C. A Low-Cost Smartphone-Based Platform for Highly Sensitive Point-of-Care Testing with Persistent Luminescent Phosphors. *Lab Chip* 2017, 17 (6), 1051-1059. https://doi.org/10.1039/C6LC01167E.

(17) Davenport, M. L.; Liu, S.; Bowers, J. E. Integrated Heterogeneous Silicon/III-V Mode-Locked Lasers. *Photon. Res., PRJ* 2018, 6 (5), 468-478. https://doi.org/10.1364/PRJ.6.000468.

(18) Turgeman, L.; Fixler, D. Photon Efficiency Optimization in Time-Correlated Single Photon Counting Technique for Fluorescence Lifetime Imaging Systems. *IEEE Transactions on Biomedical Engineering* 2013, 60 (6), 1571-1579. https://doi.org/10.1109/TBME.2013.2238671.

(19) Lu, Z. G.; Liu, J. R.; Raymond, S.; Poole, P. J.; Barrios, P. J.; Poitras, D. 312-Fs Pulse Generation from a Passive C-Band InAs/InP Quantum Dot Mode-Locked Laser. *Opt. Express, OE* 2008, 16 (14), 10835-10840. https://doi.org/10.1364/OE.16.010835.

(20) Time-Resolved Fluorescence Techniques. In *Molecular fluorescence*; John Wiley & Sons, Ltd, 2012; pp 285-325. https://doi.org/10.1002/9783527650002.ch10.

(21) MacLean, J.-P. W.; Donohue, J. M.; Resch, K. J. Direct Characterization of Ultrafast Energy-Time Entangled Photon Pairs. *Phys. Rev. Lett.* 2018, 120 (5), 053601. https://doi.org/10.1103/PhysRevLett.120.053601.

(22) Scarcelli, G.; Yun, S. H. Entangled-Photon Coincidence Fluorescence Imaging. *Opt. Express, OE* 2008, 16 (20), 16189-16194. https://doi.org/10.1364/OE.16.016189.

(23) Nasr, M. B.; Carrasco, S.; Saleh, B. E. A.; Sergienko, A. V.; Teich, M. C.; Torres, J. P.; Torner, L.; Hum, D. S.; Fejer, M. M. Ultrabroadband Biphotons Generated via Chirped Quasi-Phase-Matched Optical Parametric Down-Conversion. *Phys. Rev. Lett.* 2008, 100 (18), 183601. https://doi.org/10.1103/PhysRevLett. 100.183601.

(24) Hendrych, M.; Shi, X.; Valencia, A.; Torres, J. P. Broadening the Bandwidth of Entangled Photons: A Step towards the Generation of Extremely Short Biphotons. *Phys. Rev. A* 2009, 79 (2), 023817. https://doi.org/10.1103/PhysRevA.79.023817.

(25) Szoke, S.; He, M.; Hickam, B. P.; Cushing, S. K. Designing High-Power, Octave Spanning Entangled Photon Sources for Quantum Spectroscopy. *J. Chem. Phys.* 2021, 154 (24), 244201. https://doi.org/10.1063/5.0053688.

(26) Menzel, E. R.; Popovic, Z. D. Picosecond-resolution Fluorescence Lifetime Measuring System with a Cw Laser and a Radio. *Review of Scientific Instruments* 2008, 49 (1), 39-44. https://doi.org/10.1063/1.1135248.

(27) Zhao, J.; Ma, C.; Rüsing, M.; Mookherjea, S. High Quality Entangled Photon Pair Generation in Periodically Poled Thin-Film Lithium Niobate Waveguides. *Phys. Rev. Lett.* 2020, 124 (16), 163603. https://doi.org/10.1103/PhysRevLett. 124.163603.

(28) Javid, U. A.; Ling, J.; Staffa, J.; Li, M.; He, Y.; Lin, Q. Ultrabroadband Entangled Photons on a Nanophotonic Chip. *Phys. Rev. Lett.* 2021, 127 (18), 183601. https://doi.org/10.1103/PhysRevLett.127.183601.

(29) Kumar, R.; Ong, J. R.; Savanier, M.; Mookherjea, S. Controlling the Spectrum of Photons Generated on a Silicon Nanophotonic Chip. *Nat Commun* 2014, 5 (1), 5489. https://doi.org/10.1038/ncomms6489.

(30) Brumer, P.; Shapiro, M. Molecular Response in One-Photon Absorption via Natural Thermal Light vs. Pulsed Laser Excitation. *Proceedings of the National Academy of Sciences* 2012, 109 (48), 19575-19578. https://doi.org/10.1073/pnas. 1211209109.

(31) Zavatta, A.; Viciani, S.; Bellini, M. Single-Photon Excitation of a Coherent State: Catching the Elementary Step of Stimulated Light Emission. *Phys. Rev. A* 2005, 72 (2), 023820. https://doi.org/10.1103/PhysRevA.72.023820.

(32) Freitag, M.; Teuscher, J.; Saygili, Y.; Zhang, X.; Giordano, F.; Liska, P.; Hua, J.; Zakeeruddin, S. M.; Moser, J.-E.; Grätzel, M.; Hagfeldt, A. Dye-Sensitized Solar Cells for Efficient Power Generation under Ambient Lighting. *Nature Photon* 2017, 11 (6), 372-378. https://doi.org/10.1038/nphoton.2017.60.

(33) Reich, N. H.; van Sark, W. G. J. H. M.; Turkenburg, W. C. Charge Yield Potential of Indoor-Operated Solar Cells Incorporated into Product Integrated Photovoltaic (PIPV). *Renewable Energy* 2011, 36 (2), 642-647. https://doi.org/10.1016/j.renene.2010.07.018.

(34) Asban, S.; Dorfman, K. E.; Mukamel, S. Interferometric Spectroscopy with Quantum Light: Revealing out-of-Time-Ordering Correlators. *The Journal of Chemical Physics* 2021, 154 (21), 210901. https://doi.org/10.1063/5.0047776.

(35) Oka, H. Real-Time Analysis of Two-Photon Excitation by Correlated Photons: Pulse-Width Dependence of Excitation Efficiency. *Phys. Rev. A* 2010, 81 (5), 053837. https://doi.org/10.1103/PhysRevA.81.053837.

(36) Becker, W. *Advanced Time-Correlated Single Photon Counting Techniques*; Castleman, A. W., Toennies, J. P., Zinth, W., Eds.; Springer Series in Chemical Physics; Springer: Berlin, Heidelberg, 2005; Vol. 81. https://doi.org/10.1007/3-540-28882-1.

(37) Berezin, M. Y.; Lee, H.; Akers, W.; Achilefu, S. Near Infrared Dyes as Lifetime Solvatochromic Probes for Micropolarity Measurements of Biological Systems. *Biophys J* 2007, 93 (8), 2892-2899. https://doi.org/10.1529/biophysj.107.111609.

(38) Dorfman, K. E.; Schlawin, F.; Mukamel, S. Nonlinear Optical Signals and Spectroscopy with Quantum Light. *Rev. Mod. Phys.* 2016, 88 (4), 045008. https://doi.org/10.1103/RevModPhys.88.045008.

(39) Alander, J. T.; Kaartinen, I.; Laakso, A.; Pätilä, T.; Spillmann, T.; Tuchin, V. V.; Venermo, M.; Välisuo, P. A Review of Indocyanine Green Fluorescent Imaging in Surgery. *Journal of Biomedical Imaging* 2012, 2012, 7:7. https://doi.org/10.1155/2012/940585.

(40) Reinhart, M. B.; Huntington, C. R.; Blair, L. J.; Heniford, B. T.; Augenstein, V. A. Indocyanine Green: Historical Context, Current Applications, and Future Considerations. *Surg Innov* 2016, 23 (2), 166-175. https://doi.org/10.1177/1553350615604053.

(41) Köllner, M.; Wolfrum, J. How Many Photons Are Necessary for Fluorescence-Lifetime Measurements? *Chemical Physics Letters* 1992, 200 (1), 199-204. https://doi.org/10.1016/0009-2614 (92) 87068-Z.

(42) Beer, M.; Haase, J. F.; Ruskowski, J.; Kokozinski, R. Background Light Rejection in SPAD-Based LiDAR Sensors by Adaptive Photon Coincidence Detection. Sensors 2018, 18 (12), 4338. https://doi.org/10.3390/s18124338.

(43) Shen, B.; Bose, S.; Johnston, M. L. On-Chip High-Voltage SPAD Bias Generation Using a Dual-Mode, Closed-Loop Charge Pump. In 2017 *IEEE International Symposium on Circuits and Systems* (*ISCAS*); 2017; pp 1-4. https://doi.org/10.1109/ISCAS.2017.8050855.

(44) Tisa, S.; Zappa, F.; Labanca, I. On-Chip Detection and Counting of Single-Photons. In *IEEE International Electron Devices Meeting,* 2005. *IEDM Technical Digest.;* 2005; pp 815-818. https://doi.org/10.1109/IEDM.2005.1609480.

(45) Maruyama, Y.; Charbon, E. An All-Digital, Time-Gated 128×128 Spad Array for on-Chip, Filter-Less Fluorescence Detection. In 2011 *16th International Solid-State Sensors, Actuators and Microsystems Conference;* 2011; pp 1180-1183. https://doi.org/10.1109/TRANSDUCERS.2011.5969324.

(46) Hickam, B. P.; He, M.; Harper, N.; Szoke, S.; Cushing, S. K. Single-Photon Scattering Can Account for the Discrepancies among Entangled Two-Photon Measurement Techniques. *J. Phys. Chem.* Lett. 2022, 4934-4940. https://doi.org/10.1021/acs.jpclett.2c00865.

(47) Grinvald, A.; Steinberg, I. Z. On the Analysis of Fluorescence Decay Kinetics by the Method of Least-Squares. *Anal Biochem* 1974, 59 (2), 583-598. https://doi.org/10.1016/0003-2697 (74) 90312-1.

(48) Audrey Eshun, Xiyu Yi, Ashleigh Wilson, Sam Jeppson, Jae Hyuck Yoo, Shervin Kiannejad, Mike Rushford, Tiziana Bond, and Ted Laurence, "Fluorescence lifetime measurements using photon pair correlations generated via spontaneous parametric down conversion (SPDC)," Opt. Express 31, 26935-26947 (2023) https://doi.org/10.1364/OE.494744

Supplemental Information Used in the Characterization of the First Example

Select Optical Properties of ICG in Solvents from Literature

TABLE 1

Select optical properties of ICG in methanol, ethanol, and DMSO from ref.[1]

| Solvent | Peak absorption/emission wavelength (nm) | ε ($cm^{-1}$ $mol^{-1}$) at $\lambda_{max}$ | Ψ |
|---|---|---|---|
| Methanol | 784/809 | 221,000 | 0.09 |
| Ethanol | 787/811 | 167,000 | 0.11 |
| DMSO | 794/817 | 170,000 | 0.12 |

Confirmation of Fluorescence.

Figures 5A, 5B:
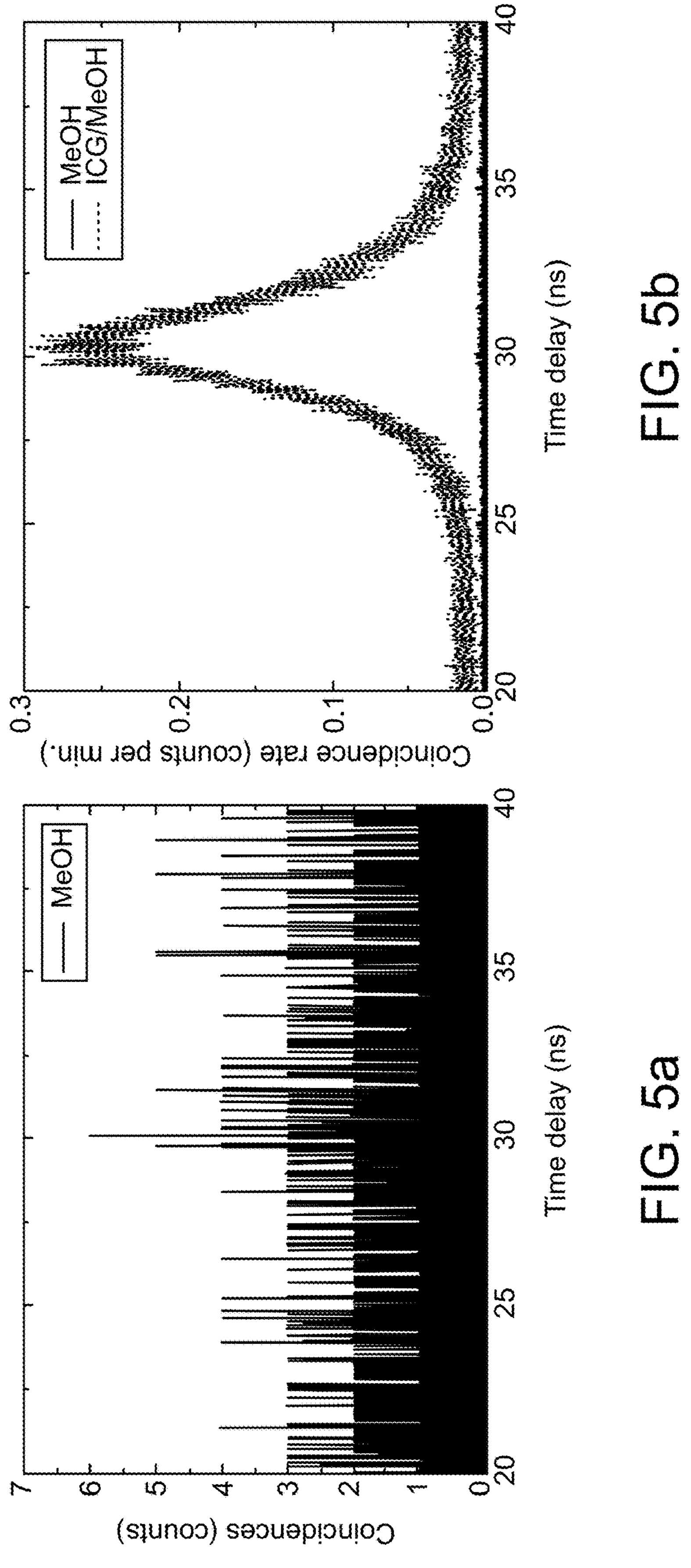
FIG. 5*a*. Coincidence histogram from methanol blank experiment.
FIG. 5*b* Coincidence rates for blank methanol and ICG/methanol solutions.

While the results presented in the example presented herein suggest that the coincidences observed with the sample present originate from fluorescence due to the good agreement between the observed histograms and fits, a control experiment as additional evidence was performed to rule out the role of scatter from the excitation beam. Additionally, a blank scan was performed, where the dye solution was replaced with only methanol. FIG. 5 displays this histogram, as well as a side-by-side comparison of the histograms observed with and without the dye. The lack of an obvious coincidence peak suggests that the SPDC flux is sufficiently filtered from the fluorescence detector, and that the coincidences observed in the experiment originated from fluorescence of the sample.

Experiment Stability and Background

Figure 6:
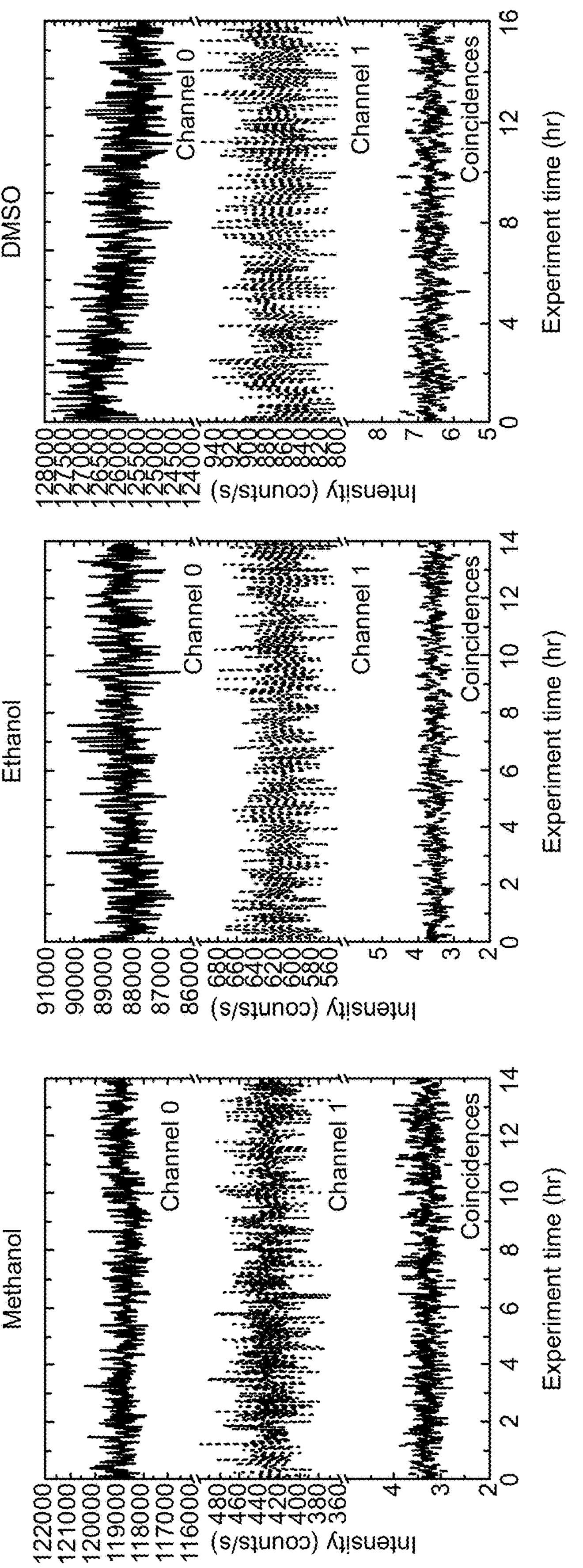
FIG. 6: Count rates in Channel 0 (reference photons), Channel 1 (fluorescence photons), and coincidences from 100 μM ICG in methanol, ethanol, and DMSO experiment over the course of the scan.

Over the course of the 14-16 hour scans presented in FIG. 3, minimal drift or sample degradation were observed. FIG. 6 shows the singles and coincidence count rates over the course of the experiment. Coincidence count rates were obtained by summing all coincidence counts between 24 and 34 nanoseconds and subtracting the product of accidentals per bin and the number of bins in this window. The accidental rate per bin was obtained by averaging the number of coincidences observed from 50 to 70 ns, far from the coincidence peak. While a slight decrease in the heralding channel (Channel 0) is observed in the DMSO data over time likely due to drift in the alignment, this change in intensity is less than 0.0X % of the original value. The singles rate in the fluorescence arm (Channel 1) as well as the coincidence rate appear to remain steady over time. While ICG is known to exhibit degradation over time due to a number of factors, we do not observe a loss in coincidence counts likely because the sample is exposed to low light levels, and the sealed cuvette containing the dye had minimal headspace. The observed fluctuations in the coincidence data is not due to technical noise, but rather the Poissonian statistics of a shot-noise limited system, as the variance of the observed rates is nearly equivalent to the mean of the rate (Table 2).

TABLE 2

Count rate means and variances demonstrating nearly shot-noise limited statistics

| Parameter | Mean Rate (counts per second) | Rate Variance $(\text{counts per second})^2$ |
|---|---|---|
| Heralding Singles | 12600 | 39300 |
| Fluorescent Singles | 870 | 880 |
| Raw Coincidences | 8.3 | 8.0 |
| Accidental Coincidences | 0.78 | 0.77 |
| True Coincidences | 7.5 | 8.7 |

The background of the experiments presented here are low, but some stray light is likely still present. From the blank experiment, the singles rate at the fluorescence detector was 28±5 counts per second, slightly higher than the specified dark count rate of the detectors at 10 counts per second. Regardless, the fluorescence counts observed during experiments with dye are substantially higher, suggesting that these counts are mostly fluorescence and not background.

Lifetime Fits with Residuals

Figure 7:
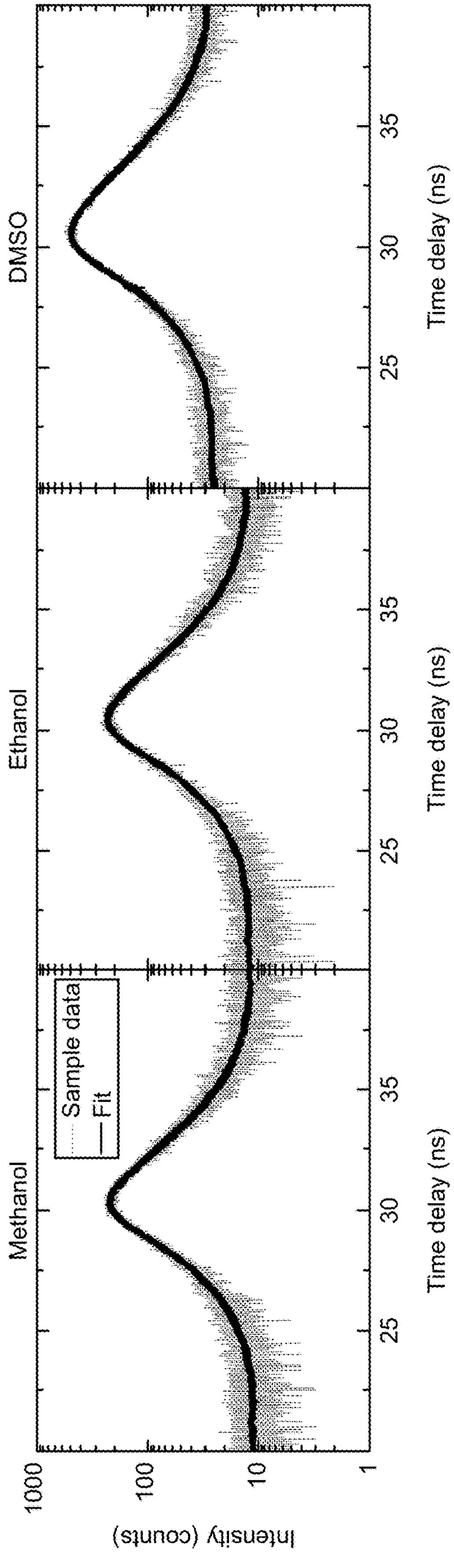
FIG. 7: Raw coincidence data and fits for ICG in methanol (left), ethanol (center), and DMSO (right) on a logarithmic scale.

Fits of the raw histograms are shown in FIG. 7 on a logarithmic scale to show the accuracy of the fit extending to the tails of the coincidence peaks over several decades of intensity.

Figure 8:
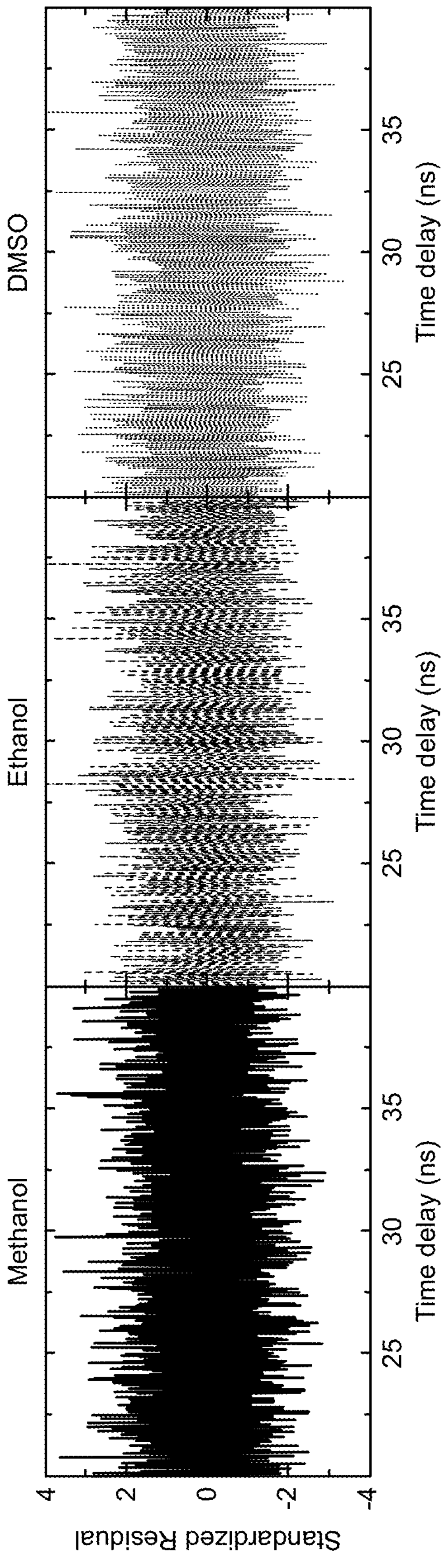
FIG. 8: Weighted residuals of the fits from FIG. 3.

The weighted residuals are shown in FIG. 8, the lack of obvious trends in the data suggest that the model used for fitting the data is reasonable. Here, the residuals are weighted by the inverse square of the fit value at each timepoint, as the uncertainty of the counts is proportional to this value for Poissonian data.

Fitting Algorithm

The fits presented in the present disclosure were performed in a custom Matlab program using the iterative reconvolution technique. First, the accidentals present in the IRF, as obtained by averaging the histogram coincidence counts from 50-70 ns, were subtracted from the raw data, and the data were truncated to a 20-40 ns window to reduce the amount of baseline present in the fit. The resulting true coincidence curve was then scaled so that the sum of counts over the IRF was unity. The experimental data from each sample were also truncated to a 20-40 ns window. The accidental counts were not subtracted from the sample coincidence curve, as these were treated as a fit parameter. The accidental data was also normalized so that the sum of counts was equal to unity. The sample response model functions were of the form:

$$R(t_i) = c\left(e^{-t_i/\tau} + A\right)$$

Where τ, the fluorescence lifetime, and A, a factor accounting for accidentals, are the fit parameters. The constant c is used to normalize the area of the sample response to unity. The normalization in all three cases is necessary because the convolved response of two functions has an area equal to the product of the areas of the original functions. The experiment response function was calculated as a discrete convolution of the sample response and the IRF, truncated to the length of the experimental data, and normalized to an area of one. Then, a trust-region nonlinear regression algorithm was performed to estimate the parameters t and A that minimize the sum of squared errors between the experimental data and the fit.

REFERENCES FOR THE SUPPLEMENTAL INFORMATION

The Following References are Incorporated by Reference Herein (1) Berezin, M. Y.; Lee, H.; Akers, W.; Achilefu, S. Near Infrared Dyes as Lifetime Solvatochromic Probes for Micropolarity Measurements of Biological Systems. *Biophys J* 2007, 93 (8), 2892-2899. https://doi.org/10.1529/biophysj.107.111609.

Advantages and Improvements

Using such states for time resolved fluorescence has three unique advantages. First, the low power requirements of CW laser diodes, coupled with the already on-chip photonics, gives a direct path to distributable and wearable time resolved fluorescence sensors. Second, changing the time-correlated photon pair wavelength is trivial through temperature tuning of phase matching of the on-chip nonlinear elements, allowing a single source to cover an octave or more of excitation wavelengths while maintaining narrow linewidths, therein allowing multiple said photon emitting materials or sensors to be tested, which currently would require multiple lasers. Third, the temporally correlated photon experiments are performed natively in a single photon excitation limit, which has advantages for measuring many quantum and molecular systems. Given the growing availability of sub-10 fs correlated photon sources, as well as on-chip photonic circuits and increasing photon counting detector repetition rates, using temporally correlated single or more photon states will allow for increased application of time resolved fluorescence while also opening scientific directions about single-photon excitation processes. Critically, current testing proves the technique exhibits equal or superior signal and measurement times to a table-top pulsed laser experiment.

Hardware Environment

Figure 9:
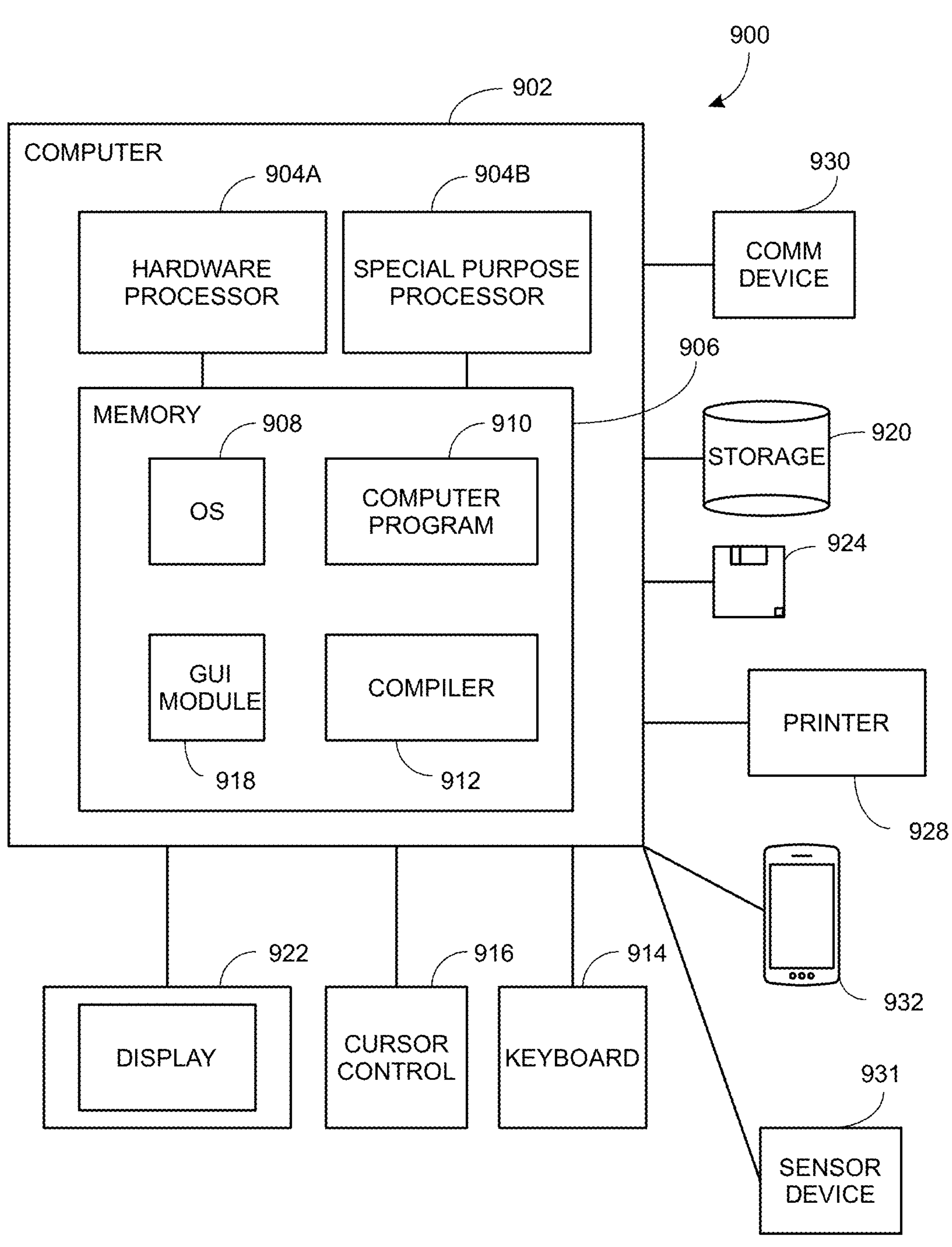
FIG. 9: Example Hardware environment.

FIG. 9 is an exemplary hardware and software environment 900 (referred to as a computer-implemented system and/or computer-implemented method) used to implement one or more embodiments of the invention. The hardware and software environment includes a computer 902 and may include peripherals. Computer 902 may be a user/client computer, server computer, or may be a database computer. The computer 902 comprises a hardware processor 904A and/or a special purpose hardware processor 904B (hereinafter alternatively collectively referred to as processor 904) and a memory 906, such as random access memory (RAM). The computer 902 may be coupled to, and/or integrated with, other devices, including input/output (I/O) devices such as a keyboard 914, a cursor control device 916 (e.g., a mouse, a pointing device, pen and tablet, touch screen, multi-touch device, etc.) and a printer 928. In one or more embodiments, computer 902 may be coupled to, or may comprise, a portable or media viewing/listening device 932 (e.g., an MP3 player, IPOD, NOOK, portable digital video player, cellular device, personal digital assistant, etc.). In yet another embodiment, the computer 902 may comprise a multi-touch device, mobile phone, gaming system, internet enabled television, television set top box, or other internet enabled device executing on various platforms and operating systems.

In one embodiment, the computer 902 operates by the hardware processor 904A performing instructions defined by the computer program 910 (e.g., a lifetime measurement/spectroscopy application) under control of an operating system 908. The computer program 910 and/or the operating system 908 may be stored in the memory 906 and may interface with the user and/or other devices to accept input and commands and, based on such input and commands and the instructions defined by the computer program 910 and operating system 908, to provide output and results.

Output/results may be presented on the display 922 or provided to another device for presentation or further processing or action. The image may be provided through a graphical user interface (GUI) module 918. Although the GUI module 918 is depicted as a separate module, the instructions performing the GUI functions can be resident or distributed in the operating system 908, the computer program 910, or implemented with special purpose memory and processors.

In one or more embodiments, the display 922 is integrated with/into the computer 902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program 910 instructions. In one embodiment, the special purpose processor 904B is an application specific integrated circuit (ASIC), field programmable gate array (FPGA).

The computer 902 may also implement a compiler 912 that allows an application or computer program 910 written in a programming language such as C, C++, Assembly, SQL, PYTHON, PROLOG, MATLAB, RUBY, RAILS, HASKELL, or other language to be translated into processor 904 readable code. Alternatively, the compiler 912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 910 accesses and manipulates data accepted from I/O devices and stored in the memory 906 of the computer 902 using the relationships and logic that were generated using the compiler 912.

The computer 902 also optionally comprises an external communication device such as a modem, satellite link, Ethernet card, or other device for accepting input from, and providing output to, other computers 902.

In one embodiment, instructions implementing the operating system 908, the computer program 910, and the compiler 912 are tangibly embodied in a non-transitory computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of computer program 910 instructions which, when accessed, read and executed by the computer 902, cause the computer 902 to perform the steps necessary to implement and/or use the present invention or to load the program of instructions into a memory 906, thus creating a special purpose data structure causing the computer 902 to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 902.

Figure 10:
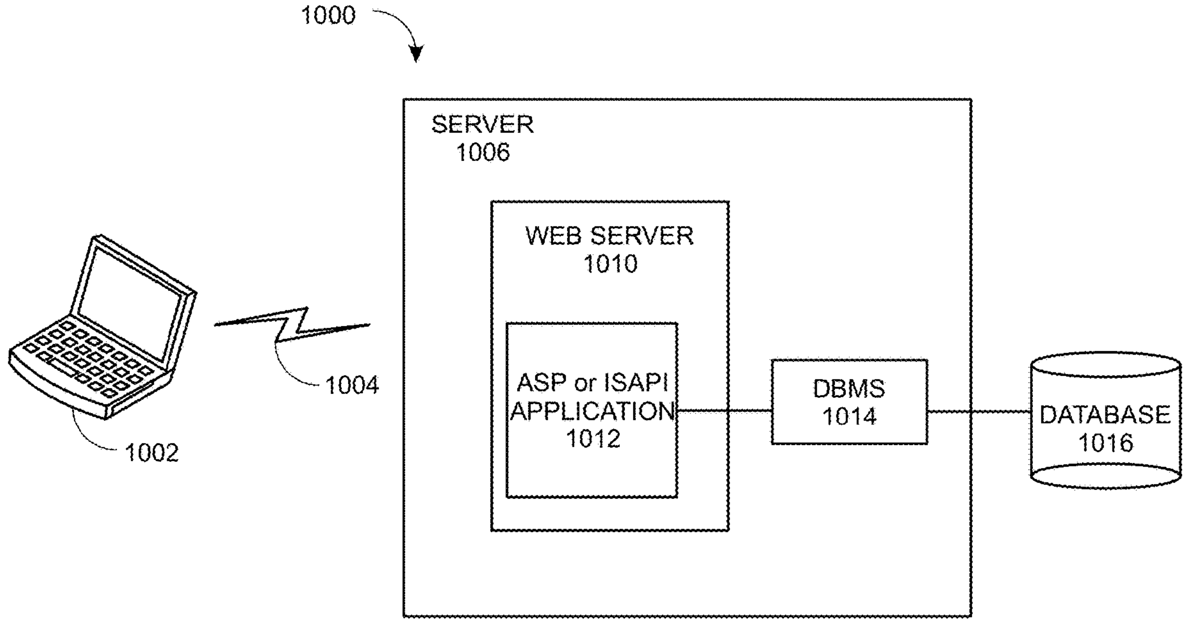
FIG. 10: Example Network Environment.

FIG. 10 schematically illustrates a typical distributed/cloud-based computer system 1000 using a network 1004 to connect client computers 1002 to server computers 1006. A typical combination of resources may include a network 1004 comprising the Internet, LANs (local area networks), WANs (wide area networks), SNA (systems network architecture) networks, or the like, clients 1002 that are personal computers or workstations (as set forth in FIG. 9), and servers 1006 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 1002 and servers 1006 in accordance with embodiments of the invention.

A network 1004 such as the Internet connects clients 1002 to server computers 1006. Network 1004 may utilize ethernet, coaxial cable, wireless communications, radio frequency (RF), etc. to connect and provide the communication between clients 1002 and servers 1006. Further, in a cloud-based computing system, resources (e.g., storage, processors, applications, memory, infrastructure, etc.) in clients 1002 and server computers 1006 may be shared by clients 1002, server computers 1006, and users across one or more networks. Resources may be shared by multiple users and can be dynamically reallocated per demand. In this regard, cloud computing may be referred to as a model for enabling access to a shared pool of configurable computing resources.

Clients 1002 may execute a client application or web browser and communicate with server computers 1006 executing web servers 1010. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1002 may be downloaded from server computer 1006 to client computers 1002 and installed as a plug-in or ACTIVEX control of a web browser. Accordingly, clients 1002 may utilize ACTIVEX components/component object model (COM) or distributed COM (DCOM) components to provide a user interface on a display of client 1002. The web server 1010 is typically a program such as MICROSOFT'S INTERNET INFORMATION SERVER.

Web server 1010 may host an Active Server Page (ASP) or Internet Server Application Programming Interface (ISAPI) application 1012, which may be executing scripts. The scripts invoke objects that execute business logic (referred to as business objects). The business objects then manipulate data in database 1016 through a database management system (DBMS) 1014. Alternatively, database 1016 may be part of, or connected directly to, client 1002 instead of communicating/obtaining the information from database 1016 across network 1004. When a developer encapsulates the business functionality into objects, the system may be referred to as a component object model (COM) system.

Accordingly, the scripts executing on web server 1010 (and/or application 1012) invoke COM objects that implement the business logic. Further, server 1006 may utilize MICROSOFT'S TRANSACTION SERVER (MTS) to access required data stored in database 1016 via an interface such as ADO (Active Data Objects), OLE DB (Object Linking and Embedding DataBase), or ODBC (Open DataBase Connectivity).

Generally, these components 1000-1016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1002 and 1006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1002 and 1006. Embodiments of the invention are implemented in hardware (e.g. ASIC) and/or as a software/application on a client 1002 or server computer 1006. Further, as described above, the client 1002 or server computer 1006 may comprise a thin client device or a portable device that has a multi-touch-based display.

Process Steps

Figure 11:
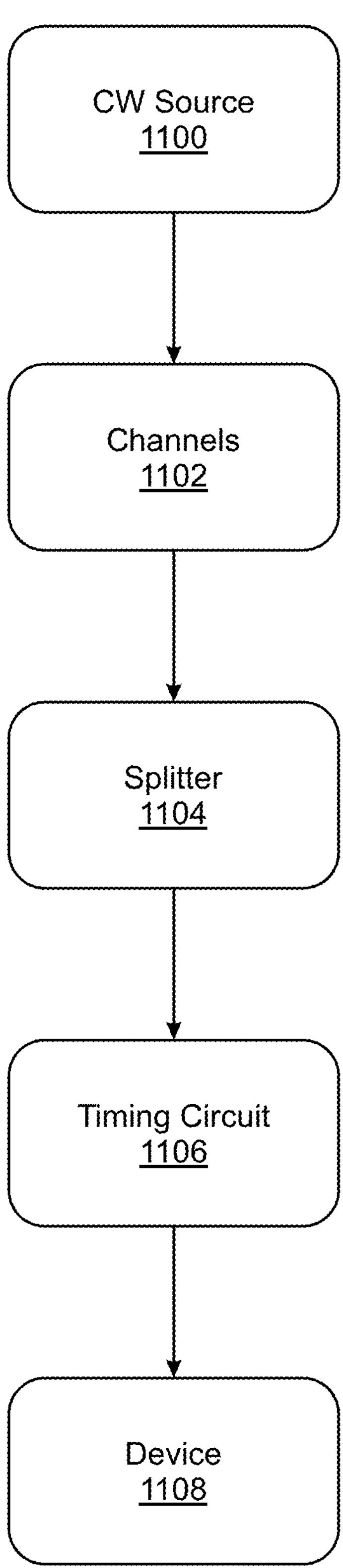
FIG. 11: Flowchart illustrating a method of making a device.

FIG. 11 illustrates a method of making a device according to one or more embodiments.

Block 1100 represents obtaining a continuous (CW) wave source of pairs of entangled photons, each pair comprising a first photon entangled with a second photon. The data presented herein used a Type-0 SPDC crystal (e.g., Type-0 periodically poled lithium tantalate crystal). The nonlinear tensor elements for Type-0 SPDC are much stronger than for Type-I and Type-II SPDC, so this type of crystal is more efficient in producing SPDC. Moreover, periodically poled Type-0 SPDC enables phase matching that is temperature dependent rather than angle dependent (for critically phase matched Type-I or Type-II). Thus, for Type-0 SPDC, wavelength can be tuned with an electrical heater rather than having the emission angle of the SPDC change as for critically phase matched Type I. The nonlinear material can be phase matched using periodic poling. The nonlinear material can comprise lithium tantalate or any nonlinear material that supports type-0 SPDC nonlinear processes for generating entangled photons. A temperature control system (e.g., heater) can be provided to tune the wavelength of the entangled photons.

Phase matching for Type-0 SPDC further enables collinear propagation more like a laser beam, rather than Type I SPDC where phase matching is non-collinear (propagates as a ring). As a result, type I phase matching requires a relay lens configuration to image the SPDC ring from the crystal to the sample excitation lens, while in a type 0 SPDC configuration, the beam can be sent directly to the sample excitation lens.

Type 0 SPDC phase matched at 405 nm further enables the SPDC nonlinear material to be directly pumped by a laser diode only (e.g., that emits 405 nanometers wavelength emission or longer, e.g., blue or violet wavelengths or longer, or ultraviolet wavelengths or longer, or 375 nm wavelength or longer), e.g., without any need for further frequency doubling/multiplying of the pump.

In various examples, the source can comprise a laser (e.g., a laser diode or laser source) or coherent source, e.g., that can be combined or integrated with a photonic chip or wearable device, e.g., the source can comprise a semiconductor device comprising an active region coupled to a p-type region and an n-type region or a p-n junction, wherein the active region emits electromagnetic radiation in response to electrical pumping or injection of carriers using the p-type region and the n-type region. In one or more embodiments, the source comprises a source outputting (e.g., wavelengths of 375 nm or more, wavelength of 405 nm or more) pumping a nonlinear material/crystal (e.g., type 0, type I or type II SPDC crystal or other parametric or nonlinear wavelength conversion process) to output the entangled photons.

Block 1102 represents coupling a pair of channels comprising a first channel terminated by a first detector configured to detect the first photon and a second channel terminated by a second detector configured to detect a output photon emitted by an excited state of matter excited by the second photon in the second channel.

In typical examples, the detectors each comprise a single channel or single photon detector, e.g., a single photon counting avalanche detector (SPAD). The advantages include higher timing resolution as compared to a camera, useful for measuring lifetime measurements. Moreover, the SPAD dead-time is much shorter than that of a camera, thereby increasing the possible acquisition rate. Thus, for one or more embodiments, use of a single photon or single channel detector is critical for the lifetime measurements and/or reducing the experiment measurement time and/or increasing the acquisition rate.

In one or more embodiments, two dichroic beam splitters and a long-pass filter to ensure that Photon 2 could not reach Detector 2 (unless it was converted to fluorescence).

Block 1104 represents positioning a splitter for splitting the pairs of entangled photons into the channels, so that the first photon comprising a reference photon is transmitted to the first channel and the second photon is transmitted to the second channel. In some embodiments, an optical path length between the splitter through the first channel to the first detector is equivalent (or matched to) the optical path length between the splitter through the second channel to the second detector. Alternatively, the path lengths do not need to be matched because the IRF accounts for any mismatches in delay. The delay between detection events is measured using a time-correlated single photon counting (TCSPC) circuit. An electronic or optical delay can be used to measure when photons arrive relative to each other.

In one or more embodiments, the splitter splits the entangled photons using a frequency based filter or splitter (rather than splitting using momentum entanglement) and without using a polarizing beamsplitter.

In some examples, the channels can and detectors can be integrated on a photonic integrated circuit on a chip. In some examples, the CW source (e.g., laser diode and/or non-linear material pumped by the laser diode, can be integrated on the same chip as part of the photonic integrated circuit, or on a different chip. The chips can be complementary metal oxide semiconductor (CMOS) compatible photonic chips.

Block 1106 represents coupling a timing circuit to the detectors operable to measure a time delay between arrival times measured at the detectors of the fluorescence photon and the first photon entangled with the second photon used to generate the fluorescence photon. In one embodiment, the delay between detection events is measured using a time-correlated single photon counting (TCSPC) circuit. An electronic or optical delay can be used to measure when photons arrive relative to each other. In some examples, the timing circuit comprises an ASIC or FPGA which can be integrated with or on a separate chip from the photonic integrated circuit.

Block 1108 represents the end result, a device. Example embodiments include, but are not limited to, the following (referring also to FIGS. 1-12).

1. A device or system 100, 931 comprising:
   - a continuous (CW) wave source 102 of pairs of entangled photons, each pair comprising a first photon entangled with a second photon;
   - a pair of channels comprising a first channel 104 terminated by a first detector D1 configured to detect the first photon and a second channel 106 terminated by a second detector D2 configured to detect a output photon (e.g., fluorescence, stimulated emission, or related to absorption) emitted by an excited state of a sample 108 (e.g., matter, a medium) excited by the second photon in the second channel;
   - a splitter 110 for splitting the pairs of entangled photons into the channels, so that the first photon comprising a reference photon is transmitted to the first channel and the second photon is transmitted to the second channel; and
   - a timing circuit 112 coupled to the detectors operable to measure a time delay between arrival times measured at the detectors of the output photon (e.g. fluorescence) and the first photon entangled with the second photon used to generate the output photon.

2. The device of clause 1, wherein the CW source comprises a laser diode 114 configured to pump a nonlinear SPDC material 116 to generate a signal and an idler comprising the first photon and the second photon, and wherein the detectors D1, D2 comprise single photon detectors.

3. The device of clause 1 or 2, comprising a photonic integrated circuit comprising at least one of the CW source or the SPDC material.

4. The device of any of the clauses 1-3, wherein the splitter (e.g., beam splitter and/or mirror) comprises a dichroic filter DCS or a filter that separates the first photon and the second photon based on their differences in frequency or wavelength.

5. The device of any of the clauses 1-4, further comprising a counting circuit 112 coupled to the detectors and operable to count a number of detection events each comprising the detection, at the detectors, of the first photon and the output photon for which the time delay is measured.

6. The device 931 of clause 5, further comprising a computer 902 configured to determine a (e.g., fluorescence) lifetime of the excited state from the detection events.

7. The device of clause 5 or 6, wherein the computer determines the (e.g., fluorescence) lifetime from statistical data comprising a frequency of the time delays (e.g., histogram) obtained from the number of the detection events.

8. The device of clause 7, wherein the number of detection events is counted during a time window selected so that an uncertainty in a measurement of the lifetime is less than 10%.

9. The device of clause 8, wherein the time window is less than 1 minute.

10. The device of any of the clauses 7-8, wherein the lifetime is measured by fitting the statistical data with a convolution of a theoretical fit and a measurement of the device's response function (IRF).

11. The device of any of the clauses 1-10, wherein the first photons and the second photons each have a frequency within a frequency spread (standard deviation) corresponding to a correlation time less than 100 femtoseconds, or short enough to measure a decay of the (e.g., fluorescence) lifetime, or such that the device's response function (IRF) has a full width at half maximum that is at least 10 times smaller than the lifetime so as to perform a time resolved measurement of the excited state.

12. The device of any of the clauses 1-11, further comprising a computer 902 configured to determine a property of the excited state from a change in a temporal correlation between the first photon and the output photon (e.g., fluorescence photon).

13. The device of any of the clauses 1-12, wherein a wavelength of the photons emitted by the CW SPDC source is tunable to cover an octave or more of excitation wavelengths while maintaining narrow linewidth at least 10 times smaller than the lifetime of the fluorophore in the excited state excited by the second photon.

14. The device of any of the clauses 1-13, further comprising:
   - an attenuator (e.g., ND) operable to suppress a flux of the entangled photons to a level below a predetermined threshold so as prevent loss of the detection events arising from a dead-time of the detectors, and
   - wherein the circuit is configured to count the first photons to monitor for drift in the time delay not associated with the lifetime.

15. A chip or wearable comprising the device of any of the clauses 1-14.

16. A fluorescence sensor, a fluorescence lifetime imaging system, a lifetime imaging system, or a multiplexed system comprising the device of any of the clauses 1-15.

17. The device of any of the clauses 1-16, wherein the second channel comprises a region for containing the sample 108 liquid, gas, solid, atomic species, or molecular species, quantum system, or fluorophore comprising the excited state.

18. The device of any of the clauses 1-17, wherein the CW source outputs the entangled photons with a power of 1 mW or less or 10 microwatts or less or wherein the device is battery powered.

19. The device of any of the clauses 5-18, wherein the computer 902 includes one or more processors; optionally one or more memories; and an application optionally stored in the one or more memories, wherein the application or program executed by the one or more processors determines the fluorescence lifetime or other analysis of the detection events or other control functionalities for controlling the operation of the device.

20. The device of any of the clauses 5-18, wherein the computer comprises a processor, an integrated circuit, application specific integrated circuit, or field programmable gate array.

21. The device of any of the clauses 5-20, the timing circuit comprises, a processor an integrated circuit, application specific integrated circuit, or field programmable gate array.

22. The device of any of the clauses 5-21, wherein the counting circuit comprises an integrated circuit, processor, application specific integrated circuit, or field programmable gate array.

23. The device of any of the clauses 5-22, wherein at least one of the counting circuit, the timing circuit, or the computer are integrated on a chip or substrate or comprise an integrated circuit.

24. The device of any of the clauses 15-23, wherein the wearable device (e.g., wearable by a human or animal or vegetation) comprises at least one of the timing circuit, the counting circuit, or the computer and a power source (e.g., battery) for powering the device.

25. The device of any of the clauses 1-24, wherein the sample 108 comprises living tissue or biological cells or an in-vivo environment and the time delay between arrival times is useful for performing a diagnosis (e.g., health state, measurement of disease) in the sample.

26. The device of clause 25, further comprising a computer 902 configured for determining the diagnosis from the time delay.

27. The device of any of the clauses 1-26, wherein the second channel comprises one or more frequency filters (e.g., long wavelength filters comprising dichroic mirror DCL and long pass filter LP2) filtering out photons (based on their differences frequency or wavelength) that do not comprise the output photon but allowing the output photon to reach the second detector. In one or more examples, the filter comprises long pass filter to block the photons (e.g., first photons and second photons) having a wavelength shorter than the longer wavelength output photon (e.g., comprising a fluorescence photon).

29. The device of any of the clauses 1-27, wherein the first photon has lower energy (longer wavelength) than the second photon and the splitter comprises a frequency cut off that directs the first photon to the first channel and the second photon to the second channel.

30. The device of any of the clauses 1-28, wherein the first channel and the second channel each comprise a waveguide or optical fiber or a free space arm coupled to their respective detectors.

31. The device of any of the clauses 1-30, wherein the source of entangled photons comprises a nonlinear material coupled to a heater or cooler for tuning a wavelength of the entangled photons.

32. The device of any of the clauses 1-31, wherein the device including the source, the channels, and the detector is fabricated using lithographic patterning of a chip or substrate (e.g., comprising the nonlinear material used to generate the entangled photons using SPDC). At least one of the timing circuit and/or counting circuit and/or pump laser diode for the nonlinear material can be integrated on the chip or coupled to the chip.

The device of any of the clauses 1-32 wherein the device can be system or apparatus or comprised in the system or apparatus.

Method of Operation

Figure 12:
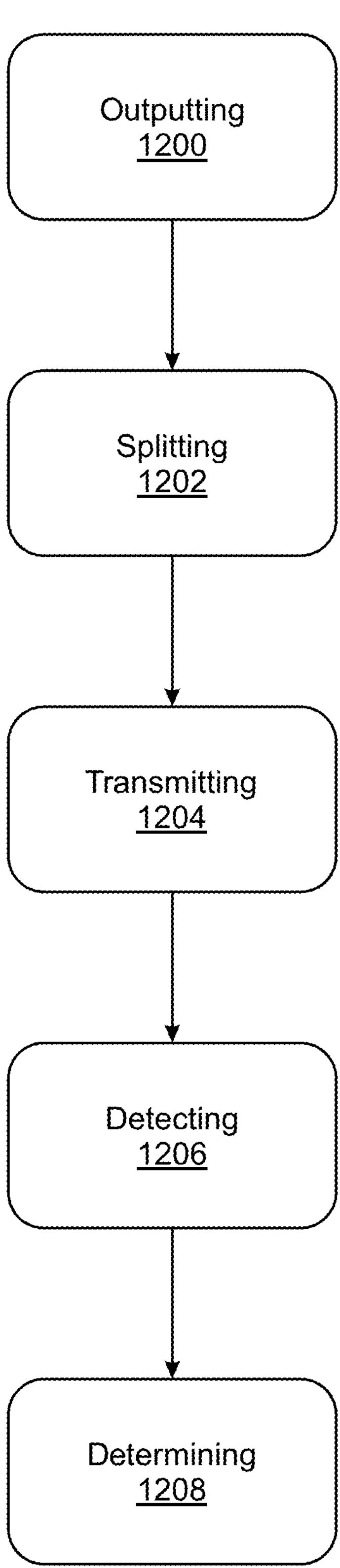
FIG. 12: Flowchart illustrating a method of operating a device.

FIG. 12 illustrates a method of performing spectroscopy.

Block 1200 represents outputting pairs of entangled photons from a continuous wave source.

Block 1202 represents splitting, at a splitter, each of the pairs into a first photon and a second photon.

Block 1204 represents transmitting the first photon through a first channel or arm to a first detector and the second photon, in a second arm or channel, to matter comprising an excited state to generate an output photon.

Block 1206 represents detecting the first photon at the first detector and the fluorescence photon at a second detector, wherein the optical path length between the splitter through the first channel to the first detector is equivalent (or matched to) the optical path length between the splitter through the second channel to the second detector;

for each of a plurality of detection events associated with a plurality of pairs of the entangled photons and each comprising a first arrival time of the first photon at the first detector and a second arrival time of the fluorescence photon (generated by the second photon paired with the first photon) at the second detector, determining (Block 1208) comprising: measuring a time delay between the first arrival time and the second arrival time; counting a number of detection of events to obtain statistical data comprising a frequency of the time delays (e.g., a histogram); and determining a fluorescence lifetime of the excited state from the statistical data.

The method can be implemented using the device of any of the clauses 1-32.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:

a continuous wave (CW) source of pairs of entangled photons, each pair comprising a first photon entangled with a second photon;

a pair of channels comprising a first channel terminated by a first detector configured to detect the first photon and a second channel terminated by a second detector configured to detect a output photon emitted by an excited state of a sample excited by the second photon in the second channel;

a splitter for splitting the pairs of entangled photons into the channels, so that the first photon comprising a reference photon is transmitted to the first channel and the second photon is transmitted to the second channel; and a timing circuit coupled to the detectors operable to measure a time delay between arrival times measured at the detectors of the output photon and the first photon entangled with the second photon used to generate the output photon.

2. The device of claim 1, wherein the CW source comprises a laser diode configured to pump a nonlinear SPDC material to generate a signal and an idler comprising the first photon and the second photon, and wherein the detectors comprise single photon detectors.

3. The device of claim 2, comprising a photonic integrated circuit comprising at least one of the CW source or the SPDC material.

4. The device of claim 1, wherein the splitter comprises a dichroic filter or a filter that separates the first photon and the second photon based on their differences in frequency or wavelength.

5. The device of claim 1, further comprising a counting circuit coupled to the detectors and operable to count a number of detection events each comprising the detection, at the detectors, of the first photon and the output photon for which the time delay is measured.

6. The device of claim 5, wherein the output photon comprises a fluorescence photon and further comprising a computer configured to determine a fluorescence lifetime of the excited state from the detection events.

7. The device of claim 6, wherein the computer determines the fluorescence lifetime from statistical data comprising a frequency of the time delays obtained from the number of the detection events.

8. The device of claim 7, wherein the number of detection events is counted during a time window selected so that an uncertainty in a measurement of the fluorescence lifetime is less than 10%.

9. The device of claim 8, wherein the time window is less than 1 minute.

10. The device of claim 7, wherein the fluorescence lifetime is measured by fitting the statistical data with a convolution of a theoretical fit and a measurement of the device's response function (IRF).

11. The device of claim 7, further comprising: an attenuator operable to suppress a flux of the entangled photons to a level below a predetermined threshold so as prevent loss of the detection events arising from a dead-time of the detectors, and wherein the circuit is configured to count the first photons to monitor for drift in the time delay not associated with the lifetime.

12. The device of claim 1, wherein the first photons and the second photons each have a frequency within a frequency spread (standard deviation) corresponding to a correlation time less than 100 femtoseconds, or short enough to measure a decay of a fluorescence lifetime of the excited state, or such that the device's response function (IRF) has a full width at half maximum that is at least 10 times smaller than a lifetime of the excited state so as to perform a time resolved measurement of the excited state.

13. The device of claim 1, further comprising a computer configured to determine a property of the excited state from a change in a temporal correlation between the first photon and the output photon comprising a fluorescence photon.

14. The device of claim 1, wherein a wavelength of the photons emitted by the CW source is tunable to cover an octave or more of excitation wavelengths while maintaining narrow linewidth at least 10 times smaller than a lifetime of the sample comprising a fluorophore in the excited state excited by the second photon.

15. A chip or wearable comprising the device of claim 1.

16. A fluorescence sensor, a fluorescence lifetime imaging system, or a multiplexed system comprising the device of claim 1.

17. The device of claim 1, wherein the second channel comprises a region for containing the sample comprising at least one of a liquid, a gas, a solid, an atomic species, a molecular species, a quantum system, or a fluorophore comprising the excited state.

18. The device of claim 1, wherein the CW source outputs the entangled photons with a power of 1 mW or less or 10 microwatts or less or wherein the device is battery powered.

19. The device of claim 1, wherein the second channel comprises one or more frequency filters filtering out photons that do not comprise the output photon but allowing the output photon to reach the second detector.

20. A method of measuring fluorescence, comprising:

outputting pairs of entangled photons from a continuous wave source;

splitting, at a splitter, each of the pairs into a first photon and a second photon;

transmitting the first photon through a first channel or arm to a first detector;

transmitting the second photon, in a second arm or channel, to a sample comprising an excited state to generate an output photon;

detecting the first photon at the first detector and the output photon at a second detector;

for each of a plurality of detection events associated with a plurality of pairs of the entangled photons and each comprising a first arrival time of the first photon at the first detector and a second arrival time of the output photon (generated by the second photon paired with the first photon) at the second detector:

measuring a time delay between the first arrival time and the second arrival time;

counting a number of detection of events to obtain statistical data comprising a frequency of the time delays; and determining a fluorescence lifetime of the excited state from the statistical data.

* * * * *